(12) United States Patent
Chen

(10) Patent No.: US 12,225,224 B2
(45) Date of Patent: Feb. 11, 2025

(54) METHODS FOR DECODING OR CODING PREDICTION MODE, DECODING OR CODING APPARATUS, AND STORAGE MEDIUM

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 314 days.

(21) Appl. No.: 17/614,141

(22) PCT Filed: Jun. 19, 2020

(86) PCT No.: PCT/CN2020/097177
§ 371 (c)(1),
(2) Date: Nov. 24, 2021

(87) PCT Pub. No.: WO2020/253841
PCT Pub. Date: Dec. 24, 2020

(65) Prior Publication Data
US 2022/0264136 A1 Aug. 18, 2022

(30) Foreign Application Priority Data
Jun. 21, 2019 (CN) .......................... 201910544430.2

(51) Int. Cl.
*H04N 19/46* (2014.01)
*H04N 19/137* (2014.01)
(Continued)

(52) U.S. Cl.
CPC .......... *H04N 19/46* (2014.11); *H04N 19/137* (2014.11); *H04N 19/159* (2014.11); *H04N 19/176* (2014.11)

(58) Field of Classification Search
CPC .... H04N 19/46; H04N 19/137; H04N 19/159; H04N 19/176
See application file for complete search history.

(56) References Cited

U.S. PATENT DOCUMENTS

| 2013/0188720 A1 | 7/2013 | Wang et al. |
| 2013/0243081 A1 | 9/2013 | Chen et al. |

(Continued)

FOREIGN PATENT DOCUMENTS

| CN | 103155555 A | 6/2013 |
| CN | 103765883 A | 4/2014 |

(Continued)

OTHER PUBLICATIONS

Extended European search report in European application No. 20826332.7 issued on Dec. 9, 2022.
(Continued)

*Primary Examiner* — Fabio S Lima
(74) *Attorney, Agent, or Firm* — Knobbe, Martens, Olson & Bear, LLP

(57) ABSTRACT

Provided is a method for decoding a prediction mode. In response to determining that a merge mode is enabled for a current block and a current candidate prediction mode is allowed for the current block, the method includes: acquiring enablement states of one or more to-be-traversed prediction modes; decoding indication information of the current candidate prediction mode from a code stream in response to determining that a candidate prediction mode being allowed is present in the to-be-traversed prediction modes; and directly determining that the current candidate prediction mode is used for the current block without decoding the indication information of the current candidate
(Continued)

Acquiring enablement states of one or more to-be-traversed prediction modes, wherein the one or more to-be-traversed prediction modes include at least one candidate prediction mode used for predicting a current block other than a current candidate prediction mode — 101

Determining whether to decode indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is enabled for the current block in response to determining that none of the to-be-traversed prediction modes is allowed — 102

Decoding the indication information in response to determining that a candidate prediction mode allowed is present in the to-be-traversed prediction modes — 103 prediction mode from the code stream in response to determining that none of the to-be-traversed prediction modes is allowed.

20 Claims, 4 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2013/0308708 A1 | 11/2013 | Sugio et al. | |
| 2014/0286428 A1 | 9/2014 | Lee et al. | |
| 2021/0250581 A1 | 8/2021 | Xu et al. | |
| 2022/0086429 A1* | 3/2022 | Ko | H04N 19/70 |

FOREIGN PATENT DOCUMENTS

| | | |
|---|---|---|
| CN | 104170381 A | 11/2014 |
| CN | 105357535 A | 2/2016 |
| CN | 105493505 A | 4/2016 |
| CN | 107318017 A | 11/2017 |
| CN | 108605122 A | 9/2018 |
| CN | 110933408 A | 3/2020 |
| JP | 2015136146 A | 7/2015 |
| JP | 2022511657 A | 2/2022 |
| WO | 2018143496 A1 | 8/2018 |
| WO | 2020117619 A1 | 6/2020 |
| WO | 2020142448 A1 | 7/2020 |
| WO | 2020149725 A1 | 7/2020 |

OTHER PUBLICATIONS

Chen (Hikvision) F et al., Non-CE4: Remove the redundancy among the flag coding for merge modes, 127. MPEG Meeting; Jul. 8, 2019-Jul. 12, 2019; Gothenburg; (Motion Picture Expert Group or ISO/IEC JTC1 /SC29 / WG11), No. m48480, Jul. 4, 2019, the whole document.
Huang (Qualcomm) H et al., Non-CE4: Merge Modes Signaling, 15. JVET Meeting; Jul. 3, 2019-Jul. 12, 2019; Gothenburg; (The Joint Video Exploration Team of ISO/ IEC JTC1/ SC29/WG11 and ITU-TSG.16 ), No. JVET-O0249; m483598, Jul. 8, 2019, pp. 1-10, the whole document.
Chen (Hikvision) F et al., Non-CE4: Remove the redundancy among the flag coding for merge modes, 15. JVET Meeting; Jul. 3, 2019-Jul. 12, 2019; Gothenburg; (The Joint Video Exploration Team of ISO/ IEC JTC1 / SC29/WG11 and ITU-TSG. 16 ), No. JVET-O0361; m484806, Jul. 6, 2019, he whole document.
Y-W Chen (Kwai) et al, CE4: Regular merge flag coding (CE4-1.2.a and CE4-1.2.b), 14. JVET Meeting; Mar. 19, 2019-Mar. 27, 2019; Geneva; ( The Joint Video Exploration Team of ISO/ IEC JTC1/ SC29/WG11 and ITU-T SG. 16), No. JVET-N032421, Mar. 21, 2019, paragraphs [0001], [0002], abstract; table 2.
Benjamin Bross et al., Versatile Video Coding (Draft 5), 14. JVET Meeting; Mar. 19, 2019-Mar. 27, 2019; Geneva; ( The Joint Video Exploration Team of ISO/ IEC JTC1/SC29/WG11 and ITU-T SG. 16), No. JVET-N1001-v8; JVET-N1001, Jun. 11, 2019, pp. 1-397, paragraphs [7.3.2.3], [7.4.3.3], [7.3.7.5], paragraphs [7.3.7.7], [7.4.8.7].
Jianle Chen et al., Algorithm description for Versatile Video Coding and Test Mode15 (VTM 5), 14. JVET Meeting; Mar. 19, 2019-Mar. 27, 2019; Geneva; (The Joint Video Exploration Team of ISO/ IEC JTC1/SC29/WG11 and ITU-T SG.16), No. JVET-N1002, Jun. 11, 2019, pp. 1-76, paragraphs [03.4].
Geonjung Ko, et al., Non-CE4: Modification of merge data syntax, Joint Video Experts Team (JVET) of ITU-T SG 16 WP 3 and ISO/IEC JTC 1/SC 29/WG 11, JVET-M0359-v2, 13th Meeting: Marrakech, MA, Jan. 2019, pp. 1-4.
Geonjung Ko, et al., CE4-1.3: Modification of merge data syntax, Joint Video Experts Team (JVET) of ITU-T SG 16 WP 3 and ISO/IEC JTC 1/SC 29/WG 11, JVET-N0237, 14th Meeting: Geneva, CH, Mar. 2019, pp. 1-3.
Yu-Ling Hsiao, et al., CE4-related: On signalling of merge flags, Joint Video Experts Team (JVET) of ITU-T SG 16WP 3 and ISO/IEC JTC 1/SC 29/WG 11, JVET-O0278-v3, 15th Meeting: Gothenburg, SE, Jul. 2019, pp. 1-6.
Manshu Chiang et al., CE10-related: Syntax redundancy removal intriangle prediction, JVET-M0185-v1 (collection of autographs before submission of this application), Joint Video Experts Team (JVET) of ITU-TSG 16 WP 3 and ISO/ IEC JTC 1/SC 29/WG 11 13th Meeting: Marrakech, Jan. 9, 2019.
Fangdong Chen et al., Fast encoding of surveillance videos based on HEVC, 2017 IEEE Visual Communications and Image Processing (VCIP), IEEE Dec. 10, 2017 URLieeexplore.
Notice of Reasons for Refusal in Japanese application No. 2021-571448 issued on Jan. 4, 2023.
Examination report in Indian application No. 202117054310 issued on Feb. 21, 2023.
Examination Report in Canadian application No. 3142208 issued on Oct. 27, 2023.
Wang, et al., "CE4-related: Remove TMVP merge and AMVP candidate for the specified blocksizes v5 (JVET-N0213_v5.docx)", JVET, 14th Meeting, Geneva, https://jvet-experts.org/doc_end_user/documents/14_Geneva/wg11/JVET-N0213-v5.zip, Mar. 27, 2019 (Mar. 27, 2019).
International search report of PCT application No. PCT /CN2020/ 097177 issued on Sep. 9, 2020.
International search report of PCT application No. PCT /CN2020/ 097184 issued on Sep. 9, 2020.
First office action of Chinese application No. 201911268202.3 issued on Aug. 11, 2020.
Notification to grant patent right for invention of Chinese application No. 201911268202.3 issued on Oct. 19, 2020.

* cited by examiner

METHODS FOR DECODING OR CODING PREDICTION MODE, DECODING OR CODING APPARATUS, AND STORAGE MEDIUM

This application is a U.S. national stage of International Application No. PCT/CN2020/097177, filed on Jun. 19, 2020, which claims priority to Chinese Patent Application No. 201910544430.2, filed on Jun. 21, 2019 and entitled "METHODS AND APPARATUSES FOR DECODING OR CODING PREDICTION MODE," the disclosure of each of which is incorporated herein by reference in its entirety.

TECHNICAL FIELD

The present disclosure relates to the field of multimedia technologies, and in particular to methods for decoding or coding a prediction mode, a decoding or coding apparatus, and a storage medium.

BACKGROUND

The prediction mode refers to a mode for decoding or coding an image block in a video frame. As there are a plurality of prediction modes, for each prediction mode, one piece of indication information is configured to indicate whether the corresponding prediction mode is enabled. By coding the indication information at a coder-side, which prediction mode is enabled for the image block is indicated. A decoder-side may decode the coded indication information to determine the prediction mode enabled for the image block.

SUMMARY

Embodiments of the present disclosure provide methods for decoding or coding a prediction mode, a decoding or coding apparatus, and a storage medium. The technical solutions are as follows.

According to a first aspect of embodiments of the present disclosure, a method for decoding a prediction mode is provided. In response to determining that a merge mode is enabled for a current block and a current candidate prediction mode is allowed for the current block, the method includes:

acquiring enablement states of one or more to-be-traversed prediction modes, wherein the one or more to-be-traversed prediction modes include at least one candidate prediction mode used for predicting the current block other than the current candidate prediction mode;

decoding indication information of the current candidate prediction mode from a code stream in response to determining that a candidate prediction mode being allowed is present in the to-be-traversed prediction modes, wherein the indication information is configured to indicate whether to enable the current candidate prediction mode for the current block; and directly determining that the current candidate prediction mode is used for the current block without decoding the indication information of the current candidate prediction mode from the code stream in response to determining that none of the to-be-traversed prediction modes is allowed.

In some embodiments, both the current candidate prediction mode and the candidate prediction mode in the to-be-traversed prediction modes are prediction modes based on the merge mode, and the prediction modes based on the merge mode at least include a regular merge mode, a merge mode with motion vector difference, a sub-block motion information based merge mode, or a combined inter-picture merge and intra-picture prediction mode.

In some embodiments, acquiring the enablement states of the to-be-traversed prediction modes includes:

determining that none of the to-be-traversed prediction modes is allowed in response to determining that the current block does not meet a mode restriction condition of each candidate prediction mode in the to-be-traversed prediction modes, wherein the mode restriction condition includes a size restriction condition, a restriction condition of other modes, a frame type restriction condition, and an enabled flag restriction condition.

In some embodiments, the method further includes:

determining that the current candidate prediction mode is not used for the current block in response to determining that the current candidate prediction mode is not allowed for the current block, wherein it is determined that the current candidate prediction mode is not allowed for the current block in response to determining that the current block does not meet a mode restriction condition of the current candidate prediction mode, wherein the mode restriction condition includes a size restriction condition, a restriction condition of other modes, a frame type restriction condition, and an enabled flag restriction condition.

In some embodiments, in the case that the current candidate prediction mode is a combined inter-picture merge and intra-picture prediction mode, the method further includes:

determining that the combined inter-picture merge and intra-picture prediction mode is allowed for the current block, in response to an enabled flag for the combined inter-picture merge and intra-picture prediction mode being in an enabled state, an area of the current block being greater than or equal to 64, and both a height and a width of the current block being less than respective thresholds; and otherwise, determining that the combined inter-picture merge and intra-picture prediction mode is not allowed for the current block.

In some embodiments, determining that the current candidate prediction mode is allowed for the current block includes:

determining that the current candidate prediction mode is allowed for the current block in response to the current block meeting all mode restriction conditions for enabling the current candidate prediction mode.

In some embodiments, the method further includes:

directly setting a value of a mode flag bit of the current candidate prediction mode to 0 without decoding the mode flag bit of the current candidate prediction mode, in response to determining that the current candidate prediction mode is not allowed for the current block.

In some embodiments, any candidate prediction mode in the to-be-traversed prediction modes is allowed for the current block in response to the current block meeting all mode restriction conditions of the candidate prediction mode.

In some embodiments, in the case that the current candidate prediction mode is a combined inter-picture merge and intra-picture prediction mode, the method further includes:

determining that the combined inter-picture merge and intra-picture prediction mode is not used for the current block and setting a value of a mode flag bit of the combined inter-picture merge and intra-picture prediction mode to 0 in response to determining that the combined inter-picture merge and intra-picture prediction mode is not allowed for the current block.

In some embodiments, the method further includes:
determining that a combined inter-picture merge and intra-picture prediction mode is not allowed for the current block, in response to a value of a sequence level enabled flag for the combined inter-picture merge and intra-picture prediction mode being 0, wherein the value of the sequence level enabled flag is present in a sequence parameter set.

In some embodiments, the method further includes:
determining that a combined inter-picture merge and intra-picture prediction mode is not allowed for the current block, in response to a height or a width of the current block being equal to or greater than 128.

In some embodiments, the method further includes:
determining that a combined inter-picture merge and intra-picture prediction mode is not allowed for the current block in response to the merge mode enabled for the current block belonging to a skip mode.

In some embodiments, the method further includes:
determining that a merge mode with motion vector difference is not allowed for the current block, in response to a value of a sequence level enabled flag for the merge mode with motion vector difference being 0, wherein the value of the sequence level enabled flag is present in a sequence parameter set.

In some embodiments, the method further includes:
determining that a sub-block motion information based merge mode is not allowed for the current block in response to a size of the current block being 4×8 or 8×4.

In some embodiments, in the case that the current candidate prediction mode is a combined inter-picture merge and intra-picture prediction mode and the to-be-traversed prediction modes include a first candidate prediction mode, the method further includes:
determining whether the combined inter-picture merge and intra-picture prediction mode is allowed for the current block;
acquiring an enablement state of the current block for the first candidate prediction mode, in response to determining that the combined inter-picture merge and intra-picture prediction mode is allowed for the current block; and
acquiring and decoding, in response to determining that the first candidate prediction mode is allowed for the current block, a flag bit of the combined inter-picture merge and intra-picture prediction mode; and determining whether to enable the combined inter-picture merge and intra-picture prediction mode for the current block based on decoded information of the flat bit,
wherein the first candidate prediction mode is configured to predict, based on motion information of the current block, two triangular sub-blocks acquired by dividing the current block according to a preset angle, the preset angle including 45° or 135°; and
determining that the first candidate prediction mode is allowed for the current block includes:
determining that the first candidate prediction mode is allowed for the current block, in response to determining that a regular merge mode, a merge mode with motion vector difference, a sub-block motion information based merge mode, and a combined inter-picture merge and intra-picture prediction mode are all disabled.

In some embodiments, in the case that the current candidate prediction mode is a combined inter-picture merge and intra-picture prediction mode and the to-be-traversed prediction modes include a first candidate prediction mode, the method further includes:
determining whether the combined inter-picture merge and intra-picture prediction mode is allowed for the current block;
acquiring an enablement state of the current block for the first candidate prediction mode, in response to determining that the combined inter-picture merge and intra-picture prediction mode is allowed for the current block; and
directly determining that the combined inter-picture merge and intra-picture prediction mode is used for the current block without decoding flag bit, in response to determining that the first candidate prediction mode is not allowed for the current block,
wherein the first candidate prediction mode is configured to predict, based on motion information of the current block, two triangular sub-blocks acquired by dividing the current block according to a preset angle, the preset angle including 45° or 135°; and
determining that the first candidate prediction mode is not allowed for the current block includes:
determining that the first candidate prediction mode is not allowed for the current block in response to a value of a sequence level enabled flag for the first candidate prediction mode being 0, wherein the value of the sequence level enabled flag is present in a sequence parameter set; or
determining that the first candidate prediction mode is not allowed for the current block in response to a current frame where the current block is located is a P frame.

According to a second of embodiments of the present disclosure, a method for coding a prediction mode is provided. In response to determining that a merge mode is enabled for a current block and a current candidate prediction mode is allowed for the current block, the method includes:
acquiring enablement states of one or more to-be-traversed prediction modes, wherein the one or more to-be-traversed prediction modes include at least one candidate prediction mode used for predicting the current block other than the current candidate prediction mode;
coding indication information of the current candidate prediction mode into a code stream in response to determining that a candidate prediction mode being allowed is present in the to-be-traversed prediction modes, wherein the indication information is configured to indicate whether to enable the current candidate prediction mode for the current block; and
not coding the indication information of the current candidate prediction mode into the code stream in response to determining that none of the to-be-traversed prediction modes is allowed.

In some embodiments, both the current candidate prediction mode and the candidate prediction mode in the to-be-traversed prediction modes are prediction modes based on the merge mode, and the prediction modes based on the merge mode at least include a regular merge mode, a merge mode with motion vector difference, a sub-block motion information based merge mode, or a combined inter-picture merge and intra-picture prediction mode.

In some embodiments, acquiring the enablement states of the to-be-traversed prediction modes includes:
determining that none of the to-be-traversed prediction modes is allowed in response to determining that the current block does not meet a mode restriction condition of each candidate prediction mode in the to-be-traversed prediction modes, wherein the mode restriction condition includes a size restriction condition, a restriction condition of other modes, a frame type restriction condition, and an enabled flag restriction condition.

In some embodiments, the method further includes:

determining that the current candidate prediction mode is not used for the current block in response to determining that the current candidate prediction mode is not allowed for the current block, wherein the current candidate prediction mode is not allowed for the current block in response determining that the current block does not meet a mode restriction condition of the current candidate prediction mode, wherein the mode restriction condition includes a size restriction condition, a restriction condition of other modes, a frame type restriction condition, and an enabled flag restriction condition.

In some embodiments, in the case that the current candidate prediction mode is a combined inter-picture merge and intra-picture prediction mode, the method further includes:

determining that the combined inter-picture merge and intra-picture prediction mode is allowed for the current block in response to an enabled flag for the combined inter-picture merge and intra-picture prediction mode being in an enabled state, an area of the current block being greater than or equal to 64, and both a height and a width of the current block being less than respective thresholds; and otherwise, determining that the combined inter-picture merge and intra-picture prediction mode is not allowed for the current block.

According to a third of embodiments of the present disclosure, a decoding apparatus is provided. In response to determining that a merge mode is enabled for a current block and a current candidate prediction mode is allowed for the current block, the decoding apparatus is configured to:

acquire enablement states of one or more to-be-traversed prediction modes, wherein the one or more to-be-traversed prediction modes include at least one candidate prediction mode used for predicting the current block other than the current candidate prediction mode;

decode indication information of the current candidate prediction mode from a code stream in response to determining that a candidate prediction mode being allowed is present in the to-be-traversed prediction modes, wherein the indication information is configured to indicate whether to enable the current candidate prediction mode for the current block; and directly determine that the current candidate prediction mode is used for the current block without decoding the indication information of the current candidate prediction mode from the code stream in response to determining that none of the to-be-traversed prediction modes is allowed.

According to a fourth of embodiments of the present disclosure, a coding apparatus is provided. In response to determining that a merge mode is enabled for a current block and a current candidate prediction mode is allowed for the current block, the coding apparatus is configured to:

acquire enablement states of one or more to-be-traversed prediction modes, wherein the one or more to-be-traversed prediction modes include at least one candidate prediction mode used for predicting the current block other than the current candidate prediction mode;

code indication information of the current candidate prediction mode into a code stream in response to determining that a candidate prediction mode being allowed is present in the to-be-traversed prediction modes, wherein the indication information is configured to indicate whether to enable the current candidate prediction mode for the current block; and not code the indication information of the current candidate prediction mode into the code stream in response to determining that none of the to-be-traversed prediction modes is allowed.

According to a fifth of embodiments of the present disclosure, a decoding device is provided. The decoding device includes:

a processor; and a memory configured to store one or more instructions executable by the processor;

wherein the processor, when loading and executing the one or more instructions, is caused to perform the method for decoding the prediction mode as defined in any one of embodiments in the first aspect.

According to a sixth of embodiments of the present disclosure, a coding device is provided. The coding device includes:

a processor; and a memory configured to store one or more instructions executable by the processor;

wherein the processor, when loading and executing the one or more instructions, is caused to perform the method for coding the prediction mode as defined in any one of embodiments in the second aspect.

According to a seventh of embodiments of the present disclosure, an electronic device is provided. The electronic device includes:

a processor; and a memory configured to store one or more instructions executable by the processor;

wherein the processor, when loading and executing the one or more instructions, is caused to perform the method for decoding the prediction mode as defined in any one of embodiments in the first aspect or the method for coding the prediction mode as defined in any one of embodiments in the second aspect.

According to an eighth of embodiments of the present disclosure, a non-transitory computer-readable storage medium storing one or more instructions is provided. The one or more instructions, when loaded and executed by a processor of an electronic device, cause the electronic device to perform the method for decoding the prediction mode as defined in any one of embodiments in the first aspect or the method for coding the prediction mode as defined in any one of embodiments in the second aspect.

In one aspect, a method for decoding a prediction mode is provided. The method includes: acquiring enablement states of one or more to-be-traversed prediction modes, wherein the one or more to-be-traversed prediction modes include at least one candidate prediction mode used for predicting a current block other than a current candidate prediction mode; and determining whether to decode indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In another aspect, a method for coding a prediction mode is provided. The method includes: acquiring enablement states of one or more to-be-traversed prediction modes, wherein the one or more to-be-traversed prediction modes include at least one candidate prediction mode used for predicting a current block other than a current candidate prediction mode; and determining whether to code indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In another aspect, a decoding apparatus is provided. The apparatus includes:
  an acquiring module, configured to acquire enablement states of one or more to-be-traversed prediction modes, wherein the one or more to-be-traversed prediction modes include at least one candidate prediction mode used for predicting a current block other than a current candidate prediction mode; and
  a determining module, configured to determine whether to decode indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In another aspect, a coding apparatus is provided. The apparatus includes:
  an acquiring module, configured to acquire enablement states of one or more to-be-traversed prediction modes, wherein the one or more to-be-traversed prediction modes include at least one candidate prediction mode used for predicting a current block other than a current candidate prediction mode; and
  a determining module, configured to determine whether to code indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In another aspect, a decoding apparatus is provided. The apparatus includes a processor; and
  a memory for storing instructions executable by the processor;
  wherein the processor is configured to perform the steps of any above method for decoding the prediction mode.

In another aspect, a coding apparatus is provided. The apparatus includes a processor; and
  a memory for storing instructions executable by the processor;
  wherein the processor is configured to perform the steps of any above method for coding the prediction mode.

In another aspect, a computer-readable storage medium is provided. The computer-readable storage medium stores instructions which, when executed by a processor, perform the steps of any above method for decoding the prediction mode.

In another aspect, a computer-readable storage medium is provided. The computer-readable storage medium stores instructions which, when executed by a processor, perform the steps of any above method for coding the prediction mode.

The beneficial effects brought about by the technical solutions according to the embodiments of the present disclosure are as follows.

When determining which prediction mode is enabled for the current block, for the current candidate prediction mode, the enablement states of the to-be-traversed prediction modes are acquired. The to-be-traversed prediction modes include at least one candidate prediction mode used for predicting the current block other than the current candidate prediction mode. Then, based on the enablement states of the to-be-traversed prediction modes, it can be determined whether to decode the indication information of the current candidate prediction mode. If none of the to-be-traversed prediction modes is allowed, the step of decoding the indication information can be skipped, and it can be directly determined that the current candidate prediction modem is used for the current block. Unlike the related art where the indication information of the current candidate prediction mode must be decoded to determine whether the prediction mode is enabled for the current block, the process of decoding the prediction mode is simplified and the efficiency in decoding the prediction mode is improved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
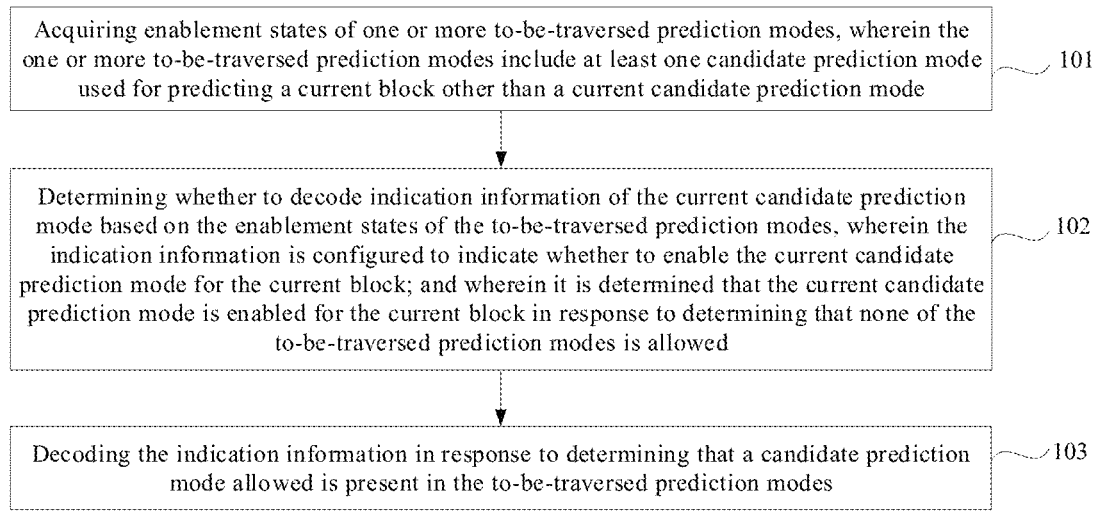
FIG. 1 is a flowchart of a method for decoding a prediction mode according to an embodiment of the present disclosure.

For clearer description of the objectives, technical solutions, and advantages in the present disclosure, the embodiments of the present disclosure are described in further detail hereinafter with reference to the accompanying drawings.

In the related art, when coding the current block, for any of the prediction modes, such as a prediction mode A, the coder-side judges whether the prediction mode is enabled. If that the prediction mode is used, the indication information of the prediction mode A is coded as 1; and if the prediction mode A is not used, then the indication information of the prediction mode A is coded as 0. In this way, the indication information of each prediction mode is coded. Subsequently, the decoder-side decodes the indication information of the prediction modes when the current block is decoded. If certain indication information is decoded as 1, it is determined that the corresponding prediction mode is used for the current block.

In this manner, the decoder-side needs to decode the indication information to determine whether the prediction mode is enabled for the current block, resulting in low efficiency in coding and decoding the prediction mode.

For the convenience of subsequent description, the terms involved in the embodiments of the present disclosure are explained here first.

Flag coding: when coding a video, there are a plurality of prediction modes. For a certain block, one of these modes may be adopted. To indicate which prediction mode is adopted, each block needs to be flagged by coding a corresponding flag bit. That is, at a coder-side, the value of the flag bit of the prediction mode is determined by a coder-side decision, and then it is coded and transmitted to a decoder-side. The decoder-side determines whether the corresponding prediction mode is enabled by decoding and analyzing the flag bit.

Merge mode: the merge mode includes five prediction modes, namely, a regular merge (normal merge) mode, a geometric partitioning mode with triangular partition (triangle prediction mode, TPM), a merge mode with motion vector difference (merge motion vector difference, MMVD), a sub-block motion information based merge (sub-block merge) mode, and a combined inter-picture merge and intra-picture prediction, CIIP, mode (combine intra inter prediciton mode). If the current block adopts the merge mode, then only one of the above five prediction modes can be adopted. In addition, for the merge mode, after a predicted value is acquired via the specific prediction mode, a reconstructed residual value needs to be added to obtain a reconstructed value.

Skip mode: the skip mode is a special merge mode. In this mode, there is no need to code a residual during coding. Therefore, if the current block adopts the skip mode, that is, there is no need to code the residual, then the combined inter-picture merge and intra-picture prediction mode is disabled by default. Therefore, the skip mode only includes four prediction modes, that is, the normal merge mode, the geometric partitioning mode with triangular partition, the merge mode with motion vector difference, and the sub-block merge mode. In addition, since there is no residual in the skip mode, the reconstructed value is directly equal to the predicted value.

A brief description of the above respective prediction modes is given below.

A brief introduction to each mode is given below.

As for the regular merge mode, it is a normal merge mode, and in this method, one piece of motion information is selected from a candidate motion information list, and a predicted value of the current block is generated based on the motion information. The candidate motion information list includes: spatial neighboring block candidate motion information, temporal neighboring block candidate motion information, spatial non-neighboring block candidate motion information, motion information acquired based on a combination of existing motion information, default motion information, and the like.

As for the merge mode with motion vector difference, this method selects a certain piece of motion information in the candidate motion information list in the normal merge mode as reference motion information, and then acquires a motion information difference by looking up a table. The final motion information is acquired based on the reference motion information and the motion information difference. The predicted value of the current block is generated based on the final motion information.

The sub-block merge mode includes an affine merge mode and a subblock-based temporal motion vector prediction (SBTMVP) mode.

The affine merge mode is similar to the normal merge mode. Similarly, this method also selects one piece of motion information from the candidate motion information list, and generates the predicted value of the current block based on the motion information. The difference is that the motion information in the candidate motion information list of the normal merge mode is all 2-parameter translation motion vectors, while the motion information in the candidate motion information list of the affine merge mode is 4-parameter or 6-parameter affine motion information.

As for the SBTMVP mode, this method directly multiplexes motion information of a certain block in a temporal reference frame to generate the predicted value of the current block. The respective sub-blocks in the block may have different motion information.

As for the combined inter-picture merge and intra-picture prediction mode, this method acquires a new predicted value of the current block by combining an intra prediction value and an inter prediction value.

As for the geometric partitioning mode with triangular partition, this method divides one block into two triangle sub-blocks (there are two types of triangle sub-blocks, i.e., a 45-degree sub-block and a 135-degree sub-block). The two triangle sub-blocks have different unidirectional motion information. This mode is only used in the merge/skip mode, and only used in a prediction process without affecting the subsequent transformation and quantization process. Here, the unidirectional motion information is also directly acquired from the candidate motion information list.

It can be seen from the above content that the merge/skip mode mentioned in the implementation of the present disclosure refers to a type of prediction mode in which one piece of motion information is directly selected from the candidate motion information list to generate the predicted value of the current block. These prediction modes do not require a motion search process at the coder-side. Except for the merge mode with motion vector difference, other prediction modes do not need to code the motion information difference, that is, a certain piece of motion information in the candidate motion information list is directly multiplexed.

Frame type: if the current image frame cannot be coded with reference to the information of other frames, the current image frame is an I frame. If the current image frame is allowed to be coded with reference to the information of any other frame (but not more than one frame), the current image frame is a P frame. That is, the P frame refers to an image frame in which there is only one reference frame list in the current frame, and each block of the current frame is only allowed to be decoded based on at most one reference image frame. If there are two reference frame lists in the current image frame, and each block of the current frame is allowed to be coded with reference to the information of other one or two frames, then the current image frame is a B frame.

Sequence parameter set: since video coding and decoding are performed in a manner of video sequence, and each video sequence includes a plurality of video frames. A sequence parameter set is configured for the video sequence, and the sequence parameter set includes parameters required for indicating the coding and decoding of each video frame in the video sequence. Here, a sequence level enabled flag for a certain prediction mode in the sequence parameter set is configured to indicate whether the prediction mode is enabled or not. For example, if a sequence level flag for a certain prediction mode is 1, it indicates that the sequence level enabled flag for the prediction mode is in an enabled state. If the sequence level flag is 0, it indicates that the sequence level enabled flag for the prediction mode is in a disabled state.

FIG. 1 is a flowchart of a method for decoding a prediction mode according to an embodiment of the present disclosure. As shown in FIG. 1, the method includes the following steps.

In step 101: enablement states of one or more to-be-traversed prediction modes are acquired, wherein the one or more to-be-traversed prediction modes include at least one candidate prediction mode used for predicting a current block other than a current candidate prediction mode.

In the embodiment of the present disclosure, to avoid that the indication information of the prediction mode has to be decoded to determine whether the prediction mode is enabled for the current block, the enablement states of the to-be-traversed prediction modes may be firstly determined by step 101 before the prediction mode is decoded, such that whether the prediction mode is enabled for the current block can be then determined without decoding the prediction mode. The enablement states of the to-be-traversed prediction modes refer to whether the candidate prediction mode is allowed for the current block in the to-be-traversed prediction modes.

The current candidate prediction mode refers to a prediction mode of which the enablement condition needs to be determined at the current time. The current block refers to an image block to be decoded at the current time. The to-be-traversed prediction modes refer to prediction modes, other than the current candidate prediction mode, of which the enablement condition for the current block has not been determined yet.

In addition, the indication information of the prediction mode may be a flag bit of the prediction mode. For example, when the flag bit of the prediction mode is 1, it indicates that the prediction mode is used for the current block. When the flag bit of the prediction mode is 0, it indicates that the prediction mode is not used for the current block.

In some embodiments, the respective prediction modes are decoded in a specified mode decoding order, this may help in preventing the prediction mode that has been decoded from being decoded repeatedly. Therefore, in step 101, the enablement states of the to-be-traversed prediction modes can be acquired according to the specified mode decoding order. In this case, as an example, the implementation of step 101 may include: acquiring an enablement state of each candidate prediction mode in the to-be-traversed prediction modes according to a traversal sequence of the to-be-traversed prediction modes, wherein the traversal sequence refers to a determining order for sequentially determining whether each candidate prediction mode in the to-be-traversed prediction modes is allowed, and the current candidate prediction mode precedes the to-be-traversed prediction modes; and determining that none of the to-be-traversed prediction modes is allowed in response to traversing to a last candidate prediction mode in the traversal sequence that is still not allowed.

As an example, it is determined that a candidate prediction mode allowed is present in the to-be-traversed prediction modes in response to traversing to a candidate prediction mode that is allowed.

As an example, the above traversal sequence of the to-be-traversed prediction modes e refers to the ranking of the to-be-traversed prediction modes in a preset specified mode decoding order. For example, the preset specified mode decoding order is an order of prediction mode 1, prediction mode 2, prediction mode 3, . . . , and prediction mode n. If the current candidate prediction mode is mode i, then the traversal sequence of the to-be-traversed prediction modes is prediction mode i+1, prediction mode i+2, . . . , and prediction mode n, where n is a positive integer, and i is a positive integer greater than or equal to 1 and less than n.

As an example, the implementation of acquiring the enablement states of the to-be-traversed prediction modes may include: sequentially traversing the prediction mode i+1, the prediction mode i+2, . . . , and the prediction mode n. During the traversal process, as long as one prediction mode allowed is determined, then it is determined that a candidate prediction mode allowed is present in the to-be-traversed prediction modes. If no prediction mode that is allowed is present when the last prediction mode n is traversed, it is determined that none of the to-be-traversed prediction modes is allowed.

As an example, the above current candidate prediction mode is one prediction mode from a prediction mode set. The prediction mode set at least includes one or more of a normal merge mode, a geometric partitioning mode with triangular partition, a merge mode with motion vector difference, a sub-block merge mode, or a combined inter-picture merge and intra-picture prediction mode. The to-be-traversed prediction modes include one or more prediction modes in the prediction mode set other than the current candidate prediction mode.

For example, the prediction mode set may include the normal merge mode, the geometric partitioning mode with triangular partition, the merge mode with motion vector difference, the sub-block merge mode, and the combined inter-picture merge and intra-picture prediction mode. In this case, the prediction mode set may also be called a merge mode set. In addition, the preset specified mode decoding order may be an order of the normal merge mode, the merge mode with motion vector difference, the sub-block merge mode, the combined inter-picture merge and intra-picture prediction mode, and the geometric partitioning mode with triangular partition. In addition, the preset specified mode decoding order may also be other orders, which is not limited in the present disclosure.

In another example, the prediction mode set may include the normal merge mode, the geometric partitioning mode with triangular partition, the merge mode with motion vector difference, and the sub-block merge mode. In this case, the prediction mode set may also be called a skip mode set. In addition, the preset specified mode decoding order may be an order of the normal merge mode, the merge mode with motion vector difference, the sub-block merge mode, and the geometric partitioning mode with triangular partition. Certainly, the preset specified mode decoding order may also be other orders, which is not limited in the present disclosure either.

The above prediction mode sets are only two possible prediction mode sets provided by the present disclosure, and the types of prediction modes included in each prediction mode set are not limited in the present disclosure. That is, no matter what type of prediction mode is included in the prediction mode set, the enablement states of the to-be-traversed prediction modes can be determined for the current candidate prediction mode by step 101.

In a possible implementation, for any prediction mode, mode restriction conditions are preset for the prediction mode, and the mode restriction conditions are some conditions that are needed to be satisfied when the prediction mode is enabled. That is, only when the current block meets all of the mode restriction conditions of the prediction mode, the prediction mode is allowed for the current block. If the current block does not meet a mode restriction condition of the prediction mode, the prediction mode is not allowed for the current block. Based on this premise, when the current candidate prediction mode is coded, it can be determined whether the current block meets the mode restriction conditions of each candidate prediction mode in the to-be-traversed prediction modes, and then the enablement states of the to-be-traversed prediction modes can be acquired.

As an example, the implementation of acquiring the enablement states of the to-be-traversed prediction modes in step 101 may include: determining that none of the to-be-traversed prediction modes is allowed in response to determining that for each candidate prediction mode in the to-be-traversed prediction modes, the current block does not meet a mode restriction condition of the candidate prediction mode. The mode restriction condition includes a size restriction condition, restriction condition of other modes, a frame type restriction condition, and a sequence level enabled flag restriction condition.

For the convenience of subsequent description, the mode restriction conditions are illustrated in the following examples. Table 1 is a schematic description of one type of mode restriction conditions according to an embodiment of the present disclosure.

TABLE 1

| Prediction mode | Size restriction condition | Restriction condition of other modes | Frame type restriction condition | Sequence level enabled flag restriction condition |
|---|---|---|---|---|
| Regular merge mode | The area is greater than or equal to 32 | None | Non-I frame | None |
| merge mode with motion vector difference | The area is greater than or equal to 32 | The normal merge mode is disabled | Non-I frame | The merge mode with motion vector difference is enabled in the sequence level enabled flag |
| Sub-block motion information based merge mode | Both width and height are greater than or equal to 8 | The normal merge mode and the merge mode with motion vector difference are both disabled | Non-I frame | The affine merge mode or SBTMVP mode is enabled in the sequence level enabled flag |
| Combined inter-picture merge and intra-picture prediction mode | The area is greater than or equal to 64, and the height and width are both less than the size threshold CTU_SIZE | The normal merge mode, the merge mode with motion vector difference, and the sub-block merge mode are all disabled, and belong to a non-skip mode | Non-I frame | The combined inter-picture merge and intra-picture prediction mode is enabled in the sequence level enabled flag |
| Geometric partitioning mode with triangular partition | The area is greater than or equal to 64 | The normal merge mode, the merge mode with motion vector difference, the sub-block merge mode, and the combined inter-picture merge and intra-picture prediction mode are all disabled | B frame | The geometric partitioning mode with triangular partition is enabled in the sequence level enabled flag |

The size restriction conditions in Table 1 all refer to the size conditions needed to be met by the current block, and the size threshold CTU_SIZE may be 128, or other values.

Step 101 is described in further detail below in conjunction with specific circumstances and the above Table 1.

Example 1: the current candidate prediction mode is the normal merge mode, and the to-be-traversed prediction modes include the geometric partitioning mode with triangular partition, the merge mode with motion vector difference, the sub-block merge mode, and the combined inter-picture merge and intra-picture prediction mode.

In Example 1, the step of determining that none of the to-be-traversed prediction modes is allowed in response to determining that for each candidate prediction mode in the to-be-traversed prediction modes, the current block does not meet a mode restriction condition of the candidate prediction mode in step 101 may be implemented by: determining that none of the to-be-traversed prediction modes is allowed in response to determining that for each candidate prediction mode in the to-be-traversed prediction modes, a sequence level enabled flag for each candidate prediction mode is in a disabled state; or, determining that none of the to-be-traversed prediction modes is allowed in response to determining that a sequence level enabled flag for the merge mode with motion vector difference in the current block is in a disabled state and a size of the current block does not meet the size restriction condition for each of other candidate prediction modes in the to-be-traversed prediction modes.

It can be seen from Table 1 that when the current candidate prediction mode is the normal merge mode, for each candidate prediction mode in the to-be-traversed prediction modes, the restriction condition requires that the sequence level enabled flag for the corresponding candidate prediction mode is in an enabled state. Therefore, if the sequence level enabled flags for all candidate prediction modes in the to-be-traversed prediction modes in the current block are 0, it is indicated that the current block does not meet the sequence level enabled flag restriction conditions of all the candidate prediction modes in the to-be-traversed prediction modes. In this way, none of the candidate prediction modes in the to-be-traversed prediction modes is allowed for the current block.

If the sequence level enabled flag for the merge mode with motion vector difference in the current block is 0, according to Table 1, it can be seen that the current block does not meet the sequence level enabled flag restriction condition for the merge mode with motion vector difference. Therefore, the merge mode with motion vector difference is not allowed for the current block. Based on this condition, if the size of the current block is 4×8 or 8×4, according to Table 1, it can be seen that the current block does not meet the size restriction conditions of the other three candidate prediction modes in the to-be-traversed prediction modes. Therefore, none of those three candidate prediction modes is allowed for the current block. In this way, none of the candidate prediction modes in the to-be-traversed prediction modes is allowed for the current block.

As an example, when it is mentioned that the size of the current block does not meet the size restriction condition of each of the other candidate prediction modes in the to-be-traversed prediction modes, it may also mean that the area of the current block is smaller than an area threshold S. The area threshold S is determined based on the size restriction condition of each of other candidate prediction modes in the to-be-traversed prediction modes. For the convenience of subsequent description, the area threshold here is referred to as area threshold S.

For example, according to Table 1, it can be seen that if the area of the current block is less than 64, then none of the last three prediction modes in Table 1 is allowed. Therefore, the area threshold S may be set to 64.

In the above implementation of Example 1, the two manners of determining that none of the to-be-traversed prediction modes is allowed are only listed as examples, but are not intended to constitute a limitation on the present disclosure. Any manner that can determine the current block as not meeting a mode restriction condition of each candidate prediction mode in the to-be-traversed prediction modes can be used in step 101, and there is no need to list all the manners here.

Example 2: the current candidate prediction mode is the merge mode with motion vector difference, and the to-be-traversed prediction modes include the sub-block merge mode, the combined inter-picture merge and intra-picture prediction mode, and the geometric partitioning mode with triangular partition.

In Example 2, the step of determining that none of the to-be-traversed prediction modes is allowed in response to determining that for each candidate prediction mode in the to-be-traversed prediction modes, the current block does not meet the mode restriction condition of the candidate prediction mode in step 101 may be implemented as: determining that none of the to-be-traversed prediction modes is allowed in response to determining that the area of the current block is smaller than the area threshold 5, where the area threshold S is determined based on the size restriction condition of each candidate prediction mode in the to-be-traversed prediction modes.

It can be seen from Example 1 that if the area of the current block is less than 64, then none of the last three prediction modes in Table 1 is allowed. Therefore, the area threshold S may be set to 64. In this case, none of the to-be-traversed prediction modes being allowed can be directly determined based on the area of the current block and the area threshold S.

Similarly, in the above implementation of Example 2, the manner of determining that none of the to-be-traversed prediction modes is allowed is only listed as an example, but is not intended to constitute a limitation on the present disclosure. Any manner that can determine the current block as not meeting a mode restriction condition of each candidate prediction mode in the to-be-traversed prediction modes can be used in step 101, and there is no need to list all the manners here.

Example 3: the current candidate prediction mode is the sub-block merge mode, and the to-be-traversed prediction modes include the combined inter-picture merge and intra-picture prediction mode and the geometric partitioning mode with triangular partition.

In Example 3, the step of determining that none of the to-be-traversed prediction modes is allowed in response to determining that for each candidate prediction mode in the to-be-traversed prediction modes, the current block does not meet the mode restriction condition of the candidate prediction mode in step 101 may be implemented as: determining that none of the to-be-traversed prediction modes is allowed in response to determining that the current block does not meet a mode restriction condition of the geometric partitioning mode with triangular partition but meets a specified condition, where the specified condition includes one or more of the following conditions: the sequence level enabled flag for the combined inter-picture merge and intra-picture prediction mode in the current block is in a disabled state; the prediction mode of the current block belongs to the skip mode; or the area of the current block is smaller than the area threshold set for the combined inter-picture merge and intra-picture prediction mode, and/or, the height and/or width of the current block is/are larger than the size threshold set for the combined inter-picture merge and intra-picture prediction mode.

As shown in Table 1, if any of the following conditions is met: the sequence level enabled flag for the combined inter-picture merge and intra-picture prediction mode in the current block is 0, or if the prediction mode of the current block belongs to the skip mode, or the area of the current block is less than S, or the height or width of the current block is greater than or equal to CTU_SIZE, it is indicated that the combined inter-picture merge and intra-picture prediction mode is not allowed for the current block. In this case, if the current block does not meet the mode restriction condition of the geometric partitioning mode with triangular partition, it can be determined that none of the to-be-traversed prediction modes is allowed.

In Example 3, as to the current block not meeting a mode restriction condition of the geometric partitioning mode with triangular partition, the following several situations may be included: the sequence level enabled flag for the geometric partitioning mode with triangular partition in the current block is in a disabled state, and/or, the image frame where the current block is located is a P frame.

For example, if the sequence level enabled flag for the geometric partitioning mode with triangular partition in the current block is 0, it can be determined that the current block does not meet the mode restriction conditions of the geometric partitioning mode with triangular partition.

Similarly, in the above implementation of Example 3, the manner of determining that none of the to-be-traversed prediction modes is allowed is only listed as an example, but is not intended to constitute a limitation on the present disclosure. Any manner that can determine the current block as not meeting a mode restriction condition of each candidate prediction mode in the to-be-traversed prediction modes can be used in step 101, and there is no need to list all the manners here.

Example 4: the current candidate prediction mode is the combined inter-picture merge and intra-picture prediction mode, and the to-be-traversed prediction modes include the geometric partitioning mode with triangular partition.

In Example 3, the step of determining that none of the to-be-traversed prediction modes is allowed in response to determining that for each candidate prediction mode in the to-be-traversed prediction modes, the current block does not meet the mode restriction condition of the candidate prediction mode in step 101 may be implemented as: determining that none of the to-be-traversed prediction modes is allowed in response to determining that the current block does not meet the mode restriction condition of the geometric partitioning mode with triangular partition.

Reference can be made to Example 3 for the implementation of determining the current block as not meeting the mode restriction condition of the geometric partitioning mode with triangular partition, which is not repeated here.

The above Examples 1 to 4 are only used for illustration purposes and do not constitute a specific limitation on the embodiments of the present disclosure. When the current candidate prediction mode and the to-be-traversed prediction modes are other types of modes, the above implementations may be referred to when determining the enablement states of the to-be-traversed prediction modes.

In step 102, whether to decode indication information of the current candidate prediction mode is determined based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

Since the indication information of the prediction mode is decoded according to the specified mode decoding order, if the current candidate prediction mode is decoded, it is indicated that none of the prediction modes preceding the current candidate prediction mode in the specified mode decoding order is allowed. In this case, if it is determined that none of the prediction modes located after the current candidate prediction mode in the specified mode decoding order is allowed, then the current candidate prediction mode is used for the current block. Therefore, in this case, the step of decoding the indication information can be skipped, and it is directly determined that the prediction mode is used for the current block. For example, the mode flag bit of the current candidate prediction mode can be directly set to 1.

In a possible implementation, to more intuitively express the enablement states of the to-be-traversed prediction modes, a variable may be introduced, that is, the number of prediction modes that are allowed in the to-be-traversed prediction modes. In this instance, the enablement states of the to-be-traversed prediction modes may be indicated by a value corresponding to the variable. If the variable is 0, it is indicated that none of the to-be-traversed prediction modes is allowed. If the variable is not 0, it is indicated that a candidate prediction mode allowed is present in the to-be-traversed prediction modes.

In step 103, the indication information is decoded in response to determining that a candidate prediction mode allowed is present in the to-be-traversed prediction modes.

If a candidate prediction mode allowed is present in the to-be-traversed prediction modes, then whether the current candidate prediction mode is enabled for the current block cannot be determined based on current conditions. Therefore, it is necessary to decode the indication information to determine whether the current candidate prediction mode is enabled for the current block.

For example, in step 103, the mode flag bit of the current candidate prediction mode is decoded, and if the obtained value is 1, it is determined that the current candidate prediction mode is used for the current block; and if the obtained value is 0, it is determined that the current candidate prediction mode is not used for the current block.

Before step 101, for the current candidate prediction mode, if it is determined that the current candidate prediction mode is not allowed, then there is no need to perform step 101 and step 103 to determine whether to enable the current candidate prediction mode. Therefore, as an example, before acquiring the enablement states of the to-be-traversed prediction modes, whether the current candidate prediction mode is allowed for the current block may also be determined. If the current candidate prediction mode is allowed for the current block, step 101 and step 103 can be performed to determine whether to enable the current candidate prediction mode.

As an example, if the current candidate prediction mode is not allowed for the current block, In this case, it may be directly determined that the current candidate prediction mode is not used for the current block. For example, the mode flag bit of the current candidate prediction mode may be directly set to 0, and the decoding process of the mode flag bit of the current candidate prediction mode is skipped.

The above step of determining whether the current candidate prediction mode is allowed for the current block may also be performed by determining whether the current block meets the mode restriction conditions of the current candidate prediction mode. If the current block meets all of the mode restriction conditions of the current candidate prediction mode, it is determined that the current candidate prediction mode is allowed for the current block. If the current block does not meet a mode restriction condition of the current candidate prediction mode, it is determined that the current candidate prediction mode is not allowed for the current block.

For example, if the sequence level enabled flag for the current candidate prediction mode in the current block is in a disabled state, then there is no need to perform steps 101 to 102, and the flag bit of the current candidate prediction mode may be directly set to 0.

The decoder-side is similar as the coder-side. In the process of coding the current block, when it needs to determine which prediction mode is enabled for the current block, the enablement states of the to-be-traversed prediction modes may be acquired for the current candidate prediction mode. The to-be-traversed prediction modes include at least one candidate prediction mode used for predicting the current block other than the current candidate prediction mode. Then, based on the enablement states of the to-be-traversed prediction modes, it can be determined whether to decode the indication information of the current candidate prediction mode. If none of the to-be-traversed prediction modes is allowed, the step of decoding the indication information can be skipped, and it can be directly determined that the current candidate prediction mode is used for the current block.

However, in the method for coding the prediction mode in the related art, the coder-side sequentially codes the indication information of the respective prediction modes in a specified order. For the convenience of subsequent description, the normal merge mode is called prediction mode 1, the merge mode with motion vector difference is called prediction mode 2, the sub-block merge mode is called prediction mode 3, the combined inter-picture merge and intra-picture prediction mode is called prediction mode 4, and the geometric partitioning mode with triangular partition is called prediction mode 5. Table 2 is used to show an order of coding the prediction modes for the merge mode in the related art. Table 3 is used to show an order of coding the prediction modes for the merge mode in the related art. As shown in Table 2, when the indication information of the prediction mode 1 is coded, whether the prediction mode 1 is enabled is determined first. If it is enabled, the indication information of the prediction mode 1 is coded as 1; and if the prediction mode 1 is disabled, the indication information of the prediction mode 1 is coded as 0, and whether the prediction mode 2 is enabled is determined. If it is enabled, the indication information of the prediction mode 2 is coded as 1; and if the prediction mode 2 is disabled, the indication information of the prediction mode 2 is coded as 0, and whether the prediction mode 3 is disabled is determined. If it is disabled, the indication information of the prediction mode 3 is coded as 1; and if the prediction mode 3 is disabled, the indication information of the prediction mode 3 is coded as 0. The coding process of Table 3 is basically the same as that of Table 2, and is not repeated here.

TABLE 2

| Prediction mode | Flag bit of prediction mode 1 | Flag bit of prediction mode 2 | Flag bit of prediction mode 3 | Flag bit of prediction mode 4 |
| --- | --- | --- | --- | --- |
| Prediction mode 1 | 1 | — | — | — |
| Prediction mode 2 | 0 | 1 | — | — |
| Prediction mode 3 | 0 | 0 | 1 | — |
| Prediction mode 4 | 0 | 0 | 0 | 1 |
| Prediction mode 5 | 0 | 0 | 0 | 0 |

TABLE 3

| Prediction mode | Flag bit of prediction mode 1 | Flag bit of prediction mode 2 | Flag bit of prediction mode 3 |
| --- | --- | --- | --- |
| Prediction mode 1 | 1 | — | — |
| Prediction mode 2 | 0 | 1 | — |
| Prediction mode 3 | 0 | 0 | 1 |
| Prediction mode 5 | 0 | 0 | 0 |

After the prediction modes are coded according to Table 2 or Table 3, in the related art, when the current block is decoded, the flag bit of the current candidate prediction mode has to be decoded, so that whether the current candidate prediction mode is enabled for the current block can be determined. However, in the embodiments of the present disclosure, if none of the to-be-traversed prediction modes is allowed, the step of decoding the indication information can be skipped, and it can be directly determined that the current candidate prediction mode is used for the current block. As such, the process of decoding the prediction mode is simplified and the efficiency in decoding the prediction mode is improved.

In the following, the embodiment shown in FIG. 1 will be further implemented as different embodiments.

Another method for decoding the prediction mode is provided in the embodiments of the present disclosure. In this method, for the five prediction modes in the merge mode (that is, the normal merge mode, the merge mode with motion vector difference, the sub-block merge mode, the combined inter-picture merge and intra-picture prediction mode, and the geometric partitioning mode with triangular partition), the specified mode decoding order for the current block may also be any order of the five prediction modes.

For the four prediction modes in the skip mode (that is, the normal merge mode, the merge mode with motion vector difference, the sub-block merge mode, and the geometric partitioning mode with triangular partition), the specified mode decoding order for the current block may also be any order of the four prediction modes.

Exemplarily, the specified mode decoding order is an order of: the prediction mode 1, the prediction mode 2, the prediction mode 3, the prediction mode 4, and the prediction mode 5. When the prediction mode 1 needs to be decoded, whether the remaining prediction mode 2, prediction mode 3, prediction mode 4, and prediction mode 5 are allowed is determined. The number of the prediction modes that are allowed is counted. If the number is 0, there is no need to decode the flag bit of prediction mode 1, and the flag bit is directly set to 1. Certainly, when the number of prediction modes included in the merge mode or the number of prediction modes included in the skip mode is not five, the above decoding process may also be referred to.

Another method for decoding the prediction mode is also provided in the embodiments of the present disclosure. In this method: if there are n prediction modes, and the specified mode decoding order is an order of: the prediction mode 1, the prediction mode 2, . . . , and the prediction mode n, then, when the prediction mode i is decoded, whether the remaining prediction mode i+1, prediction mode i+2 till prediction mode n are allowed is determined in sequence; and if the number of prediction modes that are allowed is 0, there is no need to decode the flag bit of prediction mode i, and the flag bit is directly set to 1.

Another method for decoding the prediction mode is further provided in the embodiments of the present disclosure. In this method: when whether the prediction mode i+1, the prediction mode i+2 till the prediction mode n are allowed is determined in the above embodiment, there is no need to traverse all the prediction modes, and as long as one prediction mode is allowed, the number of prediction modes that are allowed is greater than 0, such that there is no need to detect whether the subsequent prediction modes are allowed. Therefore, when the prediction mode i is decoded, whether the remaining prediction mode i+1, prediction mode i+2 till prediction mode n are allowed is determined in sequence. When a certain prediction mode j among the prediction mode i+1 to the prediction mode n is allowed, there is no need to detect whether the prediction mode j+1 till the prediction mode n is allowed, and then the decoding process of the flag bit of prediction mode i is directly performed. If none of the prediction modes is allowed in response to the prediction mode n being traversed to, there is no need to decode the flag bit of the prediction mode i, and the flag bit is directly set to 1.

Another method for decoding the prediction mode is also provided in the embodiments of the present disclosure. In this method, the specified mode decoding order set for the prediction modes is an order of: the normal merge mode, the merge mode with motion vector difference, the sub-block merge mode, the combined inter-picture merge and intra-picture prediction mode, and the geometric partitioning mode with triangular partition. If the current candidate prediction mode is the normal merge mode, the to-be-traversed prediction modes include the merge mode with motion vector difference, the sub-block merge mode, the combined inter-picture merge and intra-picture prediction mode, and the geometric partitioning mode with triangular partition.

In this case, the process of decoding the normal merge mode may be as follows: if each of the sequence levels enabled flags for the four prediction modes (that is, the merge mode with motion vector difference, the sub-block merge mode, the combined inter-picture merge and intra-picture prediction mode, and the geometric partitioning mode with triangular partition) in the current block is 0, there is no need to decode the flag bit of the normal merge mode, and the flag bit of the normal merge mode is directly set to 1.

Or, the process for decoding the normal merge mode may also be as follows: if the sequence level enabled flag for the merge mode with motion vector difference in the current block is 0, and the size of the current block is 4×8 or 8×4 (in this case none of the remaining three prediction modes is allowed), then there is no need to decode the flag bit of the normal merge mode, and the flag bit is directly set to 1.

Or, the process of decoding the normal merge mode may also be as follows: the conditions of the four prediction modes (that is, the merge mode with motion vector difference, the sub-block merge mode, the combined inter-picture merge and intra-picture prediction mode, and the geometric partitioning mode with triangular partition), in terms of size, other modes, frame type, and sequence level enabled flag, are traversed in sequence, and whether these four prediction modes can be enabled is determined in sequence. The number of prediction modes that are allowed is counted. If the number is 0, there is no need to decode the flag bit of the normal merge mode, and the flag bit is directly set to 1.

Or, the process of decoding the normal merge mode may also be as follows: if the sequence level enabled flag for the merge mode with motion vector difference in the current block is 0, and the area of the current block is smaller than the area threshold S, there is no need to decode the flag bit of the normal merge mode, and the flag bit is directly set to 1. The above area threshold S may be 64.

Or, the process of decoding the normal merge mode may also be as follows: as only the merge mode with motion vector difference and the normal merge mode are allowed to be used for blocks in 4×8 and 8×4, and the blocks in 4×4 cannot adopt the merge mode with motion vector difference and the normal merge mode, if the sequence level enabled flag for the merge mode with motion vector difference in the current block is 0, and the area (width×height) of the current block is equal to the area threshold SE, there is no need to decode the flag bit of the normal merge mode, and the flag bit is directly set to 1. The area threshold SE may be 32.

Or, the process of decoding the normal merge mode may also be as follows: in the case that the prediction mode of the current block belongs to the skip mode (in this case, the combined inter-picture merge and intra-picture prediction mode is not allowed), if the merge mode with motion vector difference (for example, the sequence level enabled flag for the merge mode with motion vector difference in the current block is 0) is not allowed for the current block, the geometric partitioning mode with triangular partition is not allowed (for example, the image frame where the current block is located is a P frame, or the sequence level enabled flag for the geometric partitioning mode with triangular partition in the current block is 0), and the current block has a width of 4 and a height of greater than or equal to 16, or a height of 4 and a width of greater than or equal to 16 (in this case, the sub-block merge mode is not allowed), then there is no need to decode the flag bit of the normal merge mode, and the flag bit is directly set to 1.

Or, the process of decoding the normal merge mode may also be as follows: in the case that the prediction mode of the current block belongs to the merge mode, if the merge mode with motion vector difference (for example, the sequence level enabled flag for the merge mode with motion vector difference in the current block is 0) is not allowed for the current block, the geometric partitioning mode with triangular partition is not allowed for the current block (for example, the image frame where the current block is located is a P frame, or the sequence level enabled flag for the geometric partitioning mode with triangular partition in the current block is 0), and the current block has a width of 4 and a height of greater than or equal to the size threshold CTU_SIZE, or a height of 4 and a width of greater than or equal to the size threshold CTU_SIZE (in this case, neither the sub-block merge mode nor the combined inter-picture merge and intra-picture prediction mode is allowed), there is no need to decode the flag bit of the normal merge mode, and the flag bit is directly set to 1. The size threshold CTU_SIZE is 128, or may be other values.

Or, the process of decoding the normal merge mode may also be as follows: in the case that the prediction mode of the current block belongs to the skip mode (in this case, the combined inter-picture merge and intra-picture prediction mode is not allowed), if the current block meets any one of the following two conditions, there is no need to decode the flag bit of the normal merge mode, and the flag bit can be directly set to 1.

Condition 1: the merge mode with motion vector difference (for example, the sequence level enabled flag for the merge mode with motion vector difference in the current block is 0) is not allowed for the current block, and the area (width×height) of the current block is equal to the area threshold SE (in this case, neither the sub-block merge mode nor the geometric partitioning mode with triangular partition is allowed). The area threshold SE may be 32.

Condition 2: the merge mode with motion vector difference (for example, the sequence level enabled flag for the merge mode with motion vector difference in the current block is 0) is not allowed for the current block, and neither the sub-block merge mode nor the geometric partitioning mode with triangular partition is allowed. Here, the sub-block merge mode being not allowed includes: the sequence level enabled flags for the affine mode and the SBTMVP mode in the current block are both 0, or the current block has a width of 4 or a height of 4. The geometric partitioning mode with triangular partition being not allowed includes: the image frame where the current block is located is a P frame, or the sequence level enabled flag for the geometric partitioning mode with triangular partition in the current block is 0.

Or, the process of decoding the normal merge mode may also be as follows: in the case that the prediction mode of the current block belongs to the merge mode, if the current block meets any one of the following two conditions, there is no need to decode the flag bit of the normal merge mode, and the flag bit can be directly set to 1.

Condition 1: if the merge mode with motion vector difference (for example, the sequence level enabled flag for the merge mode with motion vector difference in the current block is 0) is not allowed for the current block, and the area of the current block (width×height) is equal to the area threshold SE (in this case, none of the sub-block merge mode, the combined inter-picture merge and intra-picture prediction mode, and the geometric partitioning mode with triangular partition is allowed), then there is no need to decode the flag bit of the normal merge mode, and the flag bit is directly set to 1. The area threshold SE may be 32.

Condition 2: the merge mode with motion vector difference (for example, the sequence level enabled flag for the merge mode with motion vector difference in the current block is 0) is not allowed for the current block, and meanwhile none of the sub-block merge mode, the combined inter-picture merge and intra-picture prediction mode, and the geometric partitioning mode with triangular partition is allowed. Here, the condition that the sub-block merge mode being not allowed includes: the sequence level enabled flags for the affine mode and the SBTMVP mode in the current block are both 0, or the current block has a width of 4 or a height of 4. The condition that the combined inter-picture merge and intra-picture prediction mode being not allowed includes: the sequence level enabled flag for the combined inter-picture merge and intra-picture prediction mode in the current block is 0, or the current block has a width equal to the size threshold CTU_SIZE or a height of equal to the size threshold CTU_SIZE. The condition that the geometric partitioning mode with triangular partition being not allowed includes: the image frame where the current block is located is a P frame or the sequence level enabled flag for the geometric partitioning mode with triangular partition in the current block being 0. The size threshold CTU_SIZE is 128, or may be other values.

In addition, if the current block meets all of the mode restriction conditions of the normal merge mode, the above decoding process is performed. Otherwise, if the current block does not meet a mode restriction condition of the normal merge mode, the flag bit is directly set to 0, and there is no need to perform the above decoding process.

Another method for decoding the prediction mode is further provided in the embodiments of the present disclosure. In this method: the specified mode decoding order set for the prediction modes is an order of: the normal merge mode, the merge mode with motion vector difference, the sub-block merge mode, the combined inter-picture merge and intra-picture prediction mode, and the geometric partitioning mode with triangular partition. If the current candidate prediction mode is the merge mode with motion vector difference, then the to-be-traversed prediction modes include the sub-block merge mode, the combined inter-picture merge and intra-picture prediction mode, and the geometric partitioning mode with triangular partition.

In this case, the process of decoding the merge mode with motion vector difference may be as follows: if the area of the current block is less than the area threshold S (in this case, none of the sub-block merge mode, the combined inter-picture merge and intra-picture prediction mode and the geometric partitioning mode with triangular partition is allowed), there is no need to decode the flag bit of the merge mode with motion vector difference. In this case, the flag bit of the merge mode with motion vector difference is opposite to the flag bit of the normal merge mode. That is, if the flag bit of the normal merge mode is 1, then the flag bit of the merge mode with motion vector difference is 0; and if the flag bit of the normal merge mode is 0, then the flag bit of the merge mode with motion vector difference is 1. The above area threshold S may be 64.

Or, the process of decoding the merge mode with motion vector difference may also be as follows: if the area of the current block is equal to the area threshold SE, there is no need to decode the flag bit of the merge mode with motion vector difference. In this case, the flag bit of the merge mode with motion vector difference is opposite to the flag bit of the normal merge mode. The area threshold SE may be 32.

Or, the process of decoding the merge mode with motion vector difference may also be as follows: in the case that the prediction mode of the current block belongs to the skip mode (in this case, the combined inter-picture merge and intra-picture prediction mode is not allowed), if the geometric partitioning mode with triangular partition in not allowed either (for example, the image frame where the current block is located is a P frame, or the sequence level enabled flag for the geometric partitioning mode with triangular partition in the current block is 0), and the current block has a width of 4 and a height of greater than or equal to 16, or a height of 4 and a width of greater than or equal to 16 (in this case, the sub-block merge mode is not allowed either), then there is no need to decode the flag bit of the merge mode with motion vector difference. In this case, the flag bit of the merge mode with motion vector difference is opposite to the flag bit of the normal merge mode.

Or, the process of decoding the merge mode with motion vector difference may also be as follows: in the case that the prediction mode of the current block belongs to the merge mode, if the geometric partitioning mode with triangular partition is not allowed either (for example, the image frame where the current block is located is a P frame, or the sequence level enabled flag for the geometric partitioning mode with triangular partition in the current block is 0), and the current block has a width of 4 and a height of greater than or equal to the size threshold CTU_SIZE, or a height of 4 and a width of greater than or equal to the size threshold CTU_SIZE (in this case, neither the sub-block merge mode nor the combined inter-picture merge and intra-picture prediction mode is allowed), there is no need to decode the flag bit of the merge mode with motion vector difference. In this case, the flag bit of the merge mode with motion vector difference is opposite to the flag bit of the normal merge mode. The size threshold CTU_SIZE is 128, or may be other values.

Or, the process of decoding the merge mode with motion vector difference may also be as follows: in the case that the prediction mode of the current block belongs to the skip mode (in this case, the combined inter-picture merge and intra-picture prediction mode is not allowed), if the current block meets any one of the following two conditions, there is no need to decode the flag bit of the merge mode with motion vector difference, and the flag bit can be directly set to 1.

Condition 1: the area (width×height) of the current block is equal to the area threshold SE (in this case, neither the sub-block merge mode nor the geometric partitioning mode with triangular partition is allowed). The area threshold SE may be 32.

Condition 2: neither the sub-block merge mode nor the geometric partitioning mode with triangular partition is allowed for the current block. Here, the sub-block merge mode being not allowed includes: the sequence level enabled flags for the affine mode and the SBTMVP mode in the current block are both 0, or the width of the current block is equal to 4 or the height is equal to 4. The condition that the geometric partitioning mode with triangular partition is not allowed includes: the image frame where the current block is located is a P frame, or the sequence level enabled flag for the geometric partitioning mode with triangular partition in the current block is 0.

Or, the process of decoding the merge mode with motion vector difference may also be as follows: in the case that the prediction mode of the current block belongs to the merge mode, if the current block meets any one of the following two conditions, there is no need to decode the flag bit of the merge mode with motion vector difference, and the flag bit can be directly set to 1.

Condition 1: the area (width×height) of the current block is equal to the area threshold SE (in this case, none of the sub-block merge mode, the combined inter-picture merge and intra-picture prediction mode, and the geometric partitioning mode with triangular partition is allowed). The area threshold SE may be 32.

Condition 2: none of the sub-block merge mode, the combined inter-picture merge and intra-picture prediction mode, and the geometric partitioning mode with triangular partition is allowed for the current block. Here, the condition that the sub-block merge mode is not allowed includes: the sequence level enabled flags for the affine mode and the SBTMVP mode in the current block are both 0, or the width of the current block is equal to 4 or the height is equal to 4. The condition that the combined inter-picture merge and intra-picture prediction mode is not allowed includes: the sequence level enabled flag for the combined inter-picture merge and intra-picture prediction mode in the current block is 0, or the width of the current block is equal to the size threshold CTU_SIZE or the height is equal to the size threshold CTU_SIZE. The condition that the geometric partitioning mode with triangular partition is not allowed includes: the image frame where the current block is located is a P frame or the sequence level enabled flag for the geometric partitioning mode with triangular partition in the current block is 0. The size threshold CTU_SIZE is 128, or may be other values.

In addition, if the current block meets all of the mode restriction conditions of the merge mode with motion vector difference, the above decoding process is performed. If the current block does not meet a mode restriction condition of the merge mode with motion vector difference, the flag bit is directly set to 0, and there is no need to perform the above decoding process.

Another method for decoding the prediction mode is also provided in the embodiments of the present disclosure. In this method: the specified mode decoding order set for the prediction modes is an order of: the normal merge mode, the merge mode with motion vector difference, the sub-block merge mode, the combined inter-picture merge and intra-picture prediction mode, and the geometric partitioning mode with triangular partition. The current candidate prediction mode is the sub-block merge mode, and the to-be-traversed prediction modes include the combined inter-picture merge and intra-picture prediction mode and the geometric partitioning mode with triangular partition.

In this case, the process of decoding the sub-block merge mode may be as follows: if the sequence level enabled flag for the geometric partitioning mode with triangular partition in the current block is 0, or the image frame where the current block is located is a P frame, then:

(1) If the sequence level enabled flag for the combined inter-picture merge and intra-picture prediction mode in the current block is 0, there is no need to decode the flag bit of the sub-block merge mode, and the flag bit is directly set to 1.

(2) If the prediction mode of the current block belongs to the merge mode, there is no need to decode the flag bit of the sub-block merge mode, and the flag bit is directly set to 1.

(3) If the area of the current block is less than the area threshold S, or the width or height of the current block is greater than or equal to the size threshold CTU_SIZE, there is no need to decode the flag bit of the sub-block merge mode, and the flag bit is directly set to 1. The area threshold S may be 64, and the size threshold CTU_SIZE may be 128.

Or, the process of decoding the sub-block merge mode may also be as follows: in the case that the prediction mode of the current block belongs to the skip mode (in this case, the combined inter-picture merge and intra-picture prediction mode is not allowed), if the geometric partitioning mode with triangular partition is not allowed either (for example, the image frame where the current block is located is a P frame or the sequence level enabled flag for the geometric partitioning mode with triangular partition in the current block is 0), then there is no need to decode the flag bit of the sub-block merge mode, and the flag bit is directly set to 1.

Or, the process of decoding the sub-block merge mode may be as follows: in the case that the prediction mode of the current block belongs to the merge mode, if the following conditions (a) and (b) are met at the same time, there is no need to decode the flag bit of the sub-block merge mode, and the flag bit can be directly set to 1:

Condition (a): the combined inter-picture merge and intra-picture prediction mode is not allowed. For example, the sequence level enabled flag for the combined inter-picture merge and intra-picture prediction mode in the current block is 0, or the current block has a width equal to the size threshold CTU_SIZE or a height of equal to the size threshold CTU_SIZE. The size threshold CTU_SIZE is 128, or may be other values.

Condition (b): the geometric partitioning mode with triangular partition is not allowed. For example, the image frame where the current block is located is a P frame or the sequence level enabled flag for the geometric partitioning mode with triangular partition in the current block is 0.

In addition, if the current block meets all of the mode restriction conditions of the sub-block merge mode, the above decoding process is performed. If the current block does not meet a mode restriction condition of the sub-block merge mode, the flag bit is directly set to 0, and there is no need to perform the above decoding process.

Another method for decoding the prediction mode is also provided in the embodiments of the present disclosure. In this method: the specified mode decoding order set for the prediction modes is an order of: the normal merge mode, the merge mode with motion vector difference, the sub-block merge mode, the combined inter-picture merge and intra-picture prediction mode, and the geometric partitioning mode with triangular partition. The current candidate prediction mode is the combined inter-picture merge and intra-picture prediction mode, and the to-be-traversed prediction modes include the geometric partitioning mode with triangular partition.

In this case, the process of decoding the combined inter-picture merge and intra-picture prediction mode may be as follows: if the geometric partitioning mode with triangular partition is not allowed, for example, the sequence level enabled flag for the geometric partitioning mode with triangular partition in the current block is 0, or the image frame where the current block is located is a P frame, then there is no need to decode the flag bit of the combined inter-picture merge and intra-picture prediction mode, and the flag bit is directly set to 1.

In addition, if the current block meets all of the mode restriction conditions of the combined inter-picture merge and intra-picture prediction mode, the above decoding process is performed. If the current block does not meet a mode restriction condition of the combined inter-picture merge and intra-picture prediction mode, the flag bit is directly set to 0, and there is no need to perform the above decoding process.

Another method for decoding the prediction mode is also provided in the embodiments of the present disclosure. In this method: the specified mode decoding order set for the prediction modes is an order of: the normal merge mode, the merge mode with motion vector difference, the sub-block merge mode, the combined inter-picture merge and intra-picture prediction mode, and the geometric partitioning mode with triangular partition. The current candidate prediction mode is the geometric partitioning mode with triangular partition. In this case, the process of decoding the geometric partitioning mode with triangular partition may be as follows.

Here, there is no need to decode the flag bit of the geometric partitioning mode with triangular partition. If the current block meets all of the mode restriction conditions of the geometric partitioning mode with triangular partition, the flag bit of the geometric partitioning mode with triangular partition is directly set to 1; otherwise, the flag bit is 0.

In the above several embodiments, for any prediction mode, the flag bit of the prediction mode being set to 1 indicates that the current candidate prediction mode is used for the current block, and the flag bit of the prediction mode being set to 0 indicates that the current candidate prediction mode is not used for the current block.

In addition, the above several embodiments are all directed to the situation where an intra block copy merge (IBC) mode is not allowed, that is, the sequence level enabled flag for the IBC mode in the current block is 0, or, the current block is an inter-frame prediction block (a non-IBC mode prediction block). Here, under the IBC mode, a block vector is selected from a candidate block vector (BV) list, and the predicted value of the current block is generated based on the block vector. The block vector here refers to an offset vector of a reference block from the current block in the current frame.

The embodiment shown in FIG. 1 is used to explain the process of decoding the prediction mode. In the embodiments of the present disclosure, when the respective prediction modes of the current block are coded, the respective prediction modes may be coded one by one as what is done in the related art. However, based on the embodiment shown in FIG. 1, it can be seen that in some examples, whether the prediction mode is enabled for the current block can be determined without needing to decode the prediction mode. In this case, there is no need to code the prediction mode. Therefore, the embodiments of the present disclosure further provide a method for coding a prediction mode, to save the code rate overhead.

Figure 2:
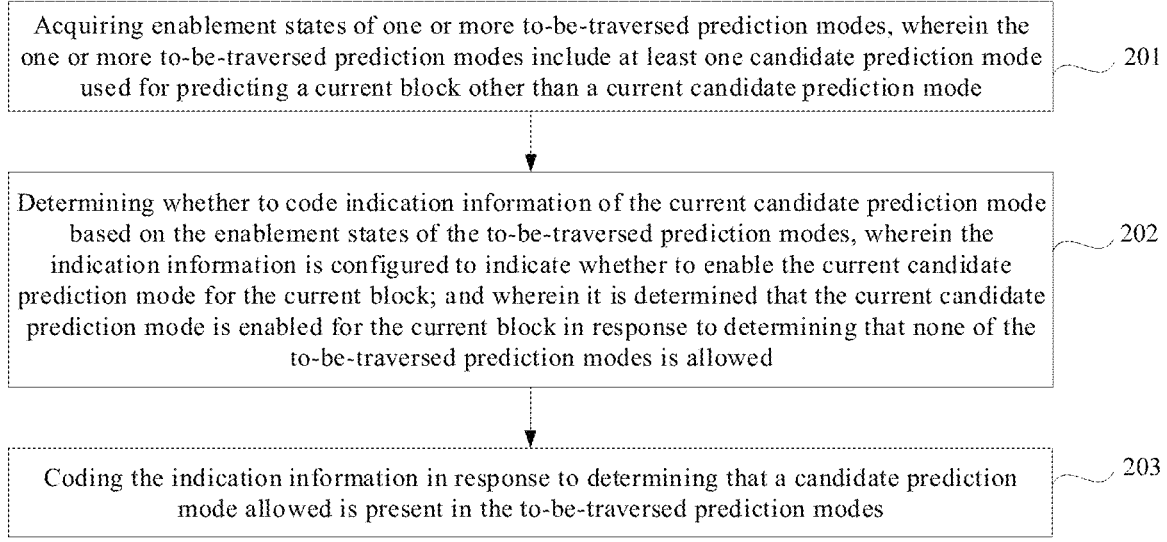
FIG. 2 is a flowchart of a method for coding a prediction mode according to an embodiment of the present disclosure.

FIG. 2 is a flowchart of a method for coding a prediction mode according to an embodiment of the present disclosure. As shown in FIG. 2, the method includes the following steps.

In step 201, enablement states of one or more to-be-traversed prediction modes are acquired, wherein the one or more to-be-traversed prediction modes include at least one candidate prediction mode used for predicting a current block other than a current candidate prediction mode.

In a possible implementation, acquiring the enablement states of the to-be-traversed prediction modes includes: acquiring an enablement state of each candidate prediction mode in the to-be-traversed prediction modes according to a traversal sequence of the to-be-traversed prediction modes, wherein the traversal sequence refers to a determining order for sequentially determining whether each candidate prediction mode in the to-be-traversed prediction modes is allowed, and the current candidate prediction mode precedes the to-be-traversed prediction modes; and determining that none of the to-be-traversed prediction modes is allowed in response to traversing to a last candidate prediction mode in the traversal sequence that is still not allowed.

In a possible implementation, after acquiring the enablement state of each candidate prediction mode in the to-be-traversed prediction modes according to the traversal sequence of the to-be-traversed prediction modes, the method further includes: determining that a candidate prediction mode allowed is present in the to-be-traversed prediction modes in response to traversing to a candidate prediction mode that is allowed.

In a possible implementation, the current candidate prediction mode is one prediction mode from a prediction mode set, wherein the prediction mode set at least includes one or more of a normal merge mode, a geometric partitioning mode with triangular partition, a merge mode with motion vector difference, a sub-block merge mode, and a combined inter-picture merge and intra-picture prediction mode. The to-be-traversed prediction modes include one or more other prediction modes in the prediction mode set than the current candidate prediction mode.

In a possible implementation, acquiring the enablement states of the to-be-traversed prediction modes includes: determining that none of the to-be-traversed prediction modes is allowed in response to determining that for each candidate prediction mode in the to-be-traversed prediction modes, the current block does not meet a mode restriction condition of the candidate prediction mode, wherein the mode restriction condition includes a size restriction condition, restriction condition of other modes, a frame type restriction condition, and a sequence level enabled flag restriction condition.

In a possible implementation, the current candidate prediction mode is the normal merge mode, and the to-be-traversed prediction modes include the geometric partitioning mode with triangular partition, the merge mode with motion vector difference, the sub-block merge mode, and the combined inter-picture merge and intra-picture prediction mode; and determining that none of the to-be-traversed prediction modes is allowed in response to determining that for each candidate prediction mode in the to-be-traversed prediction modes, the current block does not meet the mode restriction condition of the candidate prediction mode includes: determining that none of the to-be-traversed prediction modes is allowed in response to determining that for each candidate prediction mode in the to-be-traversed prediction modes, a sequence level enabled flag for each candidate prediction mode is in an disabled state; or, determining that none of the to-be-traversed prediction modes is allowed in response to determining that a sequence level enabled flag for the merge mode with motion vector difference in the current block is in an disabled state and a size of the current block does not meet a size restriction condition of each of other candidate prediction modes in the to-be-traversed prediction modes.

In a possible implementation, determining that the size of the current block does not meet the size restriction condition of each of other candidate prediction modes in the to-be-traversed prediction modes, includes: determining that an area of the current block is smaller than an area threshold, wherein the area threshold is determined based on the size restriction condition of each of other candidate prediction modes in the to-be-traversed prediction modes.

In a possible implementation, the current candidate prediction mode is the merge mode with motion vector difference, and the to-be-traversed prediction modes include the sub-block merge mode, the combined inter-picture merge and intra-picture prediction mode, and the geometric partitioning mode with triangular partition, and determining that none of the to-be-traversed prediction modes is allowed in response to determining that for each candidate prediction mode in the to-be-traversed prediction modes, the current block does not meet the mode restriction condition of the candidate prediction mode, includes: determining that none of the to-be-traversed prediction modes is allowed in response to determining that an area of the current block is smaller than an area threshold, wherein the area threshold is determined based on the size restriction condition of each of the candidate prediction modes in the to-be-traversed prediction modes.

In a possible implementation, the current candidate prediction mode is the sub-block merge mode, and the to-be-traversed prediction modes include the combined inter-picture merge and intra-picture prediction mode and the geometric partitioning mode with triangular partition; and determining that none of the to-be-traversed prediction modes is allowed in response to determining that for each candidate prediction mode in the to-be-traversed prediction modes, the current block does not meet the mode restriction condition of the candidate prediction mode, includes: determining that none of the to-be-traversed prediction modes is allowed in response to determining that the current block does not meet a mode restriction condition of the geometric partitioning mode with triangular partition and the current block meets a specified condition, wherein the specified condition includes one or more of the following conditions: a sequence level enabled flag for the combined inter-picture merge and intra-picture prediction mode in the current block is in a disabled state; a prediction mode of the current block belongs to the skip mode; or an area of the current block is smaller than an area threshold set for the combined inter-picture merge and intra-picture prediction mode, and/or, a height and/or width of the current block is greater than a size threshold set for the combined inter-picture merge and intra-picture prediction mode.

In a possible implementation, the current candidate prediction mode is the combined inter-picture merge and intra-picture prediction mode, and the to-be-traversed prediction modes include the geometric partitioning mode with triangular partition; and determining that none of the to-be-traversed prediction modes is allowed in response to determining that for each candidate prediction mode in the to-be-traversed prediction modes, the current block does not meet the mode restriction condition of the candidate prediction mode, includes: determining that none of the to-be-traversed prediction modes is allowed in response to determining that the current block does not meet a mode restriction condition of the geometric partitioning mode with triangular partition.

In a possible implementation, determining that the current block does not meet the mode restriction condition of the geometric partitioning mode with triangular partition, includes:

determining that a sequence level enabled flag for the geometric partitioning mode with triangular partition in the current block is in a disabled state, and/or, an image frame where the current block is located is a P frame.

As for the detailed descriptions of the various implementations of the above step 201, reference can be made to the explanations on step 101 in the embodiment shown in FIG. 1, which is not repeated here.

In step 202, whether to code the indication information of the current candidate prediction mode is determined based on the enablement states of the to-be-traversed prediction modes, wherein the indication information is configured to indicate whether the current candidate prediction mode is enabled for the current block; and wherein it is determined that the current candidate prediction mode is used for the current block in response to determining that none of the to-be-traversed prediction modes is allowed.

In step 203, the indication information is coded in response to determining that a candidate prediction mode allowed is present in the to-be-traversed prediction modes.

In a possible implementation, before acquiring the enablement states of the to-be-traversed prediction modes, the method further includes: performing the step of acquiring the enablement states of the to-be-traversed prediction modes in response to determining that the current candidate prediction mode is allowed for the current block.

In a possible implementation, it is determined that the current candidate prediction mode is not used for the current block in response to determining the current candidate prediction mode is not allowed for the current block. Here, the current candidate prediction mode being not allowed for the current block refers to determining that none of the to-be-traversed prediction modes is allowed in response to determining that the current block does not meet a mode restriction condition of the current candidate prediction mode; wherein the mode restriction condition includes the size restriction condition, the restriction condition of other modes, the frame type restriction condition, and the sequence level enabled flag restriction condition.

In a possible implementation, determining whether to code the indication information of the current candidate prediction mode based on the enablement states of the to-be-traversed prediction modes includes: directly determining that the current candidate prediction mode is used for the current block in response to determining that the number of prediction modes that are allowed in the to-be-traversed prediction modes is 0.

As for the detailed descriptions of the various implementations of the above step 202 to step 203, reference can be made to the explanations on step 102 to step 103 in the embodiment shown in FIG. 1, which is not repeated here. That is, the coding process of the prediction mode according to the embodiments of the present disclosure is exactly the same as the decoding process of the prediction mode, except that the decoding is changed to coding. Besides, for the coder-side, the flag bit of each prediction mode is known and does not need to be set again.

In the process of coding the current block, if which prediction mode is enabled for the current block needs to be determined, the enablement states of the to-be-traversed prediction modes are acquired for the current candidate prediction mode. Here, the to-be-traversed prediction modes include at least one candidate prediction mode used for predicting the current block other than the current candidate prediction mode. Then, based on the enablement states of the to-be-traversed prediction modes, it can be determined whether to code the indication information of the current candidate prediction mode. If none of the to-be-traversed prediction modes is allowed, the step of coding the indication information can be skipped, and it can be directly determined that the current candidate prediction mode is used for the current block. Unlike the related art where the indication information of the current candidate prediction mode must be coded, the process of coding the prediction mode is simplified, the efficiency in coding the prediction mode is improved, and the code rate overhead is saved.

Figure 3:
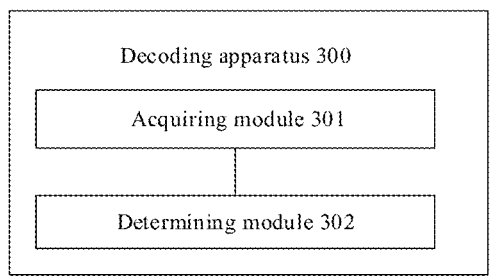
FIG. 3 is a structural diagram of a decoding apparatus according to an embodiment of the present disclosure.

FIG. 3 is a structural diagram of a decoding apparatus according to an embodiment of the present disclosure. As shown in FIG. 3, the apparatus 300 includes:

an acquiring module 301, configured to acquire enablement states of one or more to-be-traversed prediction modes, wherein the one or more to-be-traversed prediction modes include at least one candidate prediction mode used for predicting a current block other than a current candidate prediction mode; and a determining module 302, configured to determine whether to decode indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In a possible implementation, the determining module is specifically configured to decode the indication information in response to determining that a candidate prediction mode allowed is present in the to-be-traversed prediction modes.

In a possible implementation, the acquiring module is specifically configured to acquire an enablement state of each candidate prediction mode in the to-be-traversed prediction modes according to a traversal sequence of the to-be-traversed prediction modes, wherein the traversal sequence refers to a determining order for sequentially determining whether each candidate prediction mode in the to-be-traversed prediction modes is allowed, and the current candidate prediction mode precedes the to-be-traversed prediction mode; and determine that none of the to-be-traversed prediction modes is allowed in response to traversing to a last candidate prediction mode in the traversal sequence that is still not allowed.

In a possible implementation, the acquiring module is further specifically configured to determine that a candidate prediction mode allowed is present in the to-be-traversed prediction modes in response to traversing to a candidate prediction mode that is allowed.

In a possible implementation, the current candidate prediction mode is one prediction mode from a prediction mode set, wherein the prediction mode set at least includes one or more of a normal merge mode, a geometric partitioning mode with triangular partition, a merge mode with motion vector difference, a sub-block merge mode, and a combined inter-picture merge and intra-picture prediction mode; and the to-be-traversed prediction modes include one or more of other prediction modes in the prediction mode set than the current candidate prediction mode.

In a possible implementation, the acquiring module is specifically configured to determine that none of the to-be-traversed prediction modes is allowed in response to determining that for each candidate prediction mode in the to-be-traversed prediction modes, the current block does not meet a mode restriction condition of the candidate prediction mode, wherein the mode restriction condition includes a size restriction condition, restriction condition of other modes, a frame type restriction condition, and a sequence level enabled flag restriction condition.

In a possible implementation, the current candidate prediction mode is the normal merge mode, and the to-be-traversed prediction modes include the geometric partitioning mode with triangular partition, the merge mode with motion vector difference, the sub-block merge mode, and the combined inter-picture merge and intra-picture prediction mode; the acquiring module is specifically configured to: determine that none of the to-be-traversed prediction modes is allowed in response to determining that for each candidate prediction mode in the to-be-traversed prediction modes, a sequence level enabled flag for each candidate prediction mode is in an disabled state; or, determine that none of the to-be-traversed prediction modes is allowed in response to determining that a sequence level enabled flag for the merge mode with motion vector difference in the current block is in an disabled state and a size of the current block does not meet a size restriction condition of each of other candidate prediction modes in the to-be-traversed prediction modes.

In a possible implementation, determining that the size of the current block does not meet the size restriction condition of each of other candidate prediction modes in the to-be-traversed prediction modes includes: determining that an area of the current block is smaller than an area threshold, wherein the area threshold is determined based on the size restriction condition of each of other candidate prediction modes in the to-be-traversed prediction modes.

In a possible implementation, the current candidate prediction mode is the merge mode with motion vector difference, and the to-be-traversed prediction modes include the sub-block merge mode, the combined inter-picture merge and intra-picture prediction mode, and the geometric partitioning mode with triangular partition. The acquiring module is specifically configured to: determine that none of the to-be-traversed prediction modes is allowed in response to determining that the area of the current block is smaller than the area threshold, wherein the area threshold is determined based on the size restriction condition of each candidate prediction mode in the to-be-traversed prediction modes.

In a possible implementation, the current candidate prediction mode is the sub-block merge mode, and the to-be-traversed prediction modes include the combined inter-picture merge and intra-picture prediction mode and the geometric partitioning mode with triangular partition, and the acquiring module is specifically configured to: determine that none of the to-be-traversed prediction modes is allowed in response to determining that the current block does not meet a mode restriction condition of the geometric partitioning mode with triangular partition and meets a specified condition, wherein the specified condition includes one or more of the following conditions: the sequence level enabled flag for the combined inter-picture merge and intra-picture prediction mode in the current block is in a disabled state; the prediction mode of the current block belongs to a skip mode; and the area of the current block is smaller than the area threshold set for the combined inter-picture merge and intra-picture prediction mode, and/or, the height and/or width of the current block is larger than the size threshold set for the combined inter-picture merge and intra-picture prediction mode.

In a possible implementation, the current candidate prediction mode is the combined inter-picture merge and intra-picture prediction mode, and the to-be-traversed prediction modes include the geometric partitioning mode with triangular partition. The acquiring module is specifically configured to: determine that none of the to-be-traversed prediction modes is allowed in response to determining that the current block does not meet a mode restriction condition of the geometric partitioning mode with triangular partition.

In a possible implementation, determining that the current block does not meet the mode restriction condition of the geometric partitioning mode with triangular partition includes: a sequence level enabled flag for the geometric partitioning mode with triangular partition in the current block is in a disabled state, and/or, the image frame where the current block is located is a P frame.

In a possible implementation, the acquiring module is further configured to perform the step of acquiring the enablement states of the to-be-traversed prediction modes in response to determining that the current candidate prediction mode is allowed for the current block.

In a possible implementation, the determining module is further configured to determine that the current candidate prediction mode is not allowed for the current block in response to determining that the current candidate prediction mode is not used for the current block. Here, current candidate prediction mode being not allowed for the current block refers to that the current block does not meet a mode restriction condition of the current candidate prediction mode, and as such, it is determined that none of the to-be-traversed prediction modes is allowed, wherein the mode restriction condition includes the size restriction condition, restriction condition of other modes, the frame type restriction condition, and the sequence level enabled flag restriction condition.

In a possible implementation, the determining module is specifically configured to:
determine that the current candidate prediction mode is used for the current block in response to determining that the number of prediction modes that are allowed in the to-be-traversed prediction modes is 0.

In the process of coding the current block, if which prediction mode is enabled for the current block needs to be determined, the enablement states of the to-be-traversed prediction modes are acquired for the current candidate prediction mode. Here, the to-be-traversed prediction modes include at least one candidate prediction mode used for predicting the current block other than the current candidate prediction mode. Then, based on the enablement states of the to-be-traversed prediction modes, whether to decode the indication information of the current candidate prediction mode can be determined. If none of the to-be-traversed prediction modes is allowed, the step of decoding the indication information can be skipped, and it can be directly determined that the current candidate prediction mode is used for the current block. Unlike the related art where the indication information of the current candidate prediction mode must be decoded to determine whether the current candidate prediction mode is enabled for the current block, the process of decoding the prediction mode is simplified and the efficiency in decoding the prediction mode is improved.

It should be noted that the decoding apparatuses according to the above embodiments, when used for decoding the prediction mode, are only exemplified by dividing the apparatuses into the above respective functional modules. In practice, the above functions may be performed by the different functional modules according to requirements. That is, the internal structure of the apparatuses may be divided into different functional modules to perform all or parts of the functions described above. In addition, the decoding apparatuses according to the above embodiments have the same concept as the embodiments of the methods for decoding the prediction mode. References can be made to the method embodiments for the specific implementation process, which is not repeated here.

Figure 4:
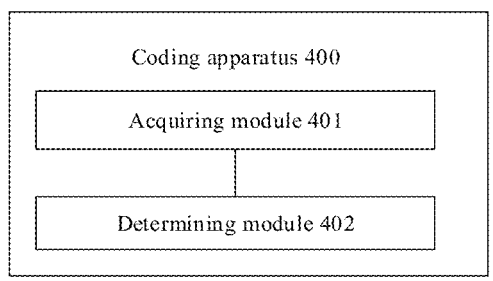
FIG. 4 is a structural diagram of a coding apparatus according to an embodiment of the present disclosure.

FIG. 4 is a structural diagram of a coding apparatus according to an embodiment of the present disclosure. As shown in FIG. 4, the apparatus 400 includes:
an acquiring module 401, configured to acquire enablement states of one or more to-be-traversed prediction modes, wherein the one or more to-be-traversed prediction modes include at least one candidate prediction mode used for predicting a current block other than a current candidate prediction mode; and
a determining module 402, configured to determine whether to code the indication information of the current candidate prediction mode based on the enablement states of the to-be-traversed prediction modes, wherein the indication information is configured to indicate whether to enable the current candidate prediction mode for the current block; and wherein it is determined that the current candidate prediction mode is used for the current block in response to determining that none of the to-be-traversed prediction modes is allowed.

In a possible implementation, the determining module is specifically configured to: code the indication information in response to determining that a candidate prediction mode allowed is present in the to-be-traversed prediction modes.

In a possible implementation, the acquiring module is specifically configured to: acquire the enablement state of each candidate prediction mode in the to-be-traversed prediction modes according to a traversal sequence of the to-be-traversed prediction modes, wherein traversal sequence refers to a determining order for sequentially determining whether each candidate prediction mode in the to-be-traversed prediction modes is allowed, and the current candidate prediction mode precedes the to-be-traversed prediction modes; and determine that none of the to-be-traversed prediction modes is allowed in response to traversing to a last candidate prediction mode in the traversal sequence that is still not allowed.

In a possible implementation, the acquiring module is further specifically configured to: determine that a candidate prediction mode allowed is present in the to-be-traversed prediction modes in response to traversing to a candidate prediction mode that is allowed.

In a possible implementation, the current candidate prediction mode is one prediction mode from a prediction mode set, wherein the prediction mode set at least includes one or more of a normal merge mode, a geometric partitioning mode with triangular partition, a merge mode with motion vector difference, a sub-block merge mode, and a combined inter-picture merge and intra-picture prediction mode; and the to-be-traversed prediction modes include one or more of other prediction modes in the prediction mode set than the current candidate prediction mode.

In a possible implementation, the acquiring module is specifically configured to: determine that none of the to-be-traversed prediction modes is allowed in response to determining that for each candidate prediction mode in the to-be-traversed prediction modes, the current block does not meet a mode restriction condition of the candidate prediction mode, wherein the mode restriction condition includes a size restriction condition, restriction condition of other modes, a frame type restriction condition, and a sequence level enabled flag restriction condition.

In a possible implementation, the current candidate prediction mode is the normal merge mode, and the to-be-traversed prediction modes include the geometric partitioning mode with triangular partition, the merge mode with motion vector difference, the sub-block merge mode, and the combined inter-picture merge and intra-picture prediction mode; and the acquiring module is specifically configured to: determine that none of the to-be-traversed prediction modes is allowed in response to determining that for each candidate prediction mode in the to-be-traversed prediction modes, a sequence level enabled flag for each candidate prediction mode is in an disabled state; or, determine that none of the to-be-traversed prediction modes is allowed in response to determining that a sequence level enabled flag for the merge mode with motion vector difference in the current block is in an disabled state and a size of the current block does not meet a size restriction condition of each of other candidate prediction modes in the to-be-traversed prediction modes.

In a possible implementation, determining that the size of the current block does not meet the size restriction condition of each of other candidate prediction modes in the to-be-traversed prediction modes includes: determining that an area of the current block is smaller than an area threshold, wherein the area threshold is determined based on the size restriction condition of each of other candidate prediction modes in the to-be-traversed prediction modes.

In a possible implementation, the current candidate prediction mode is the merge mode with motion vector difference, and the to-be-traversed prediction modes include the sub-block merge mode, the combined inter-picture merge and intra-picture prediction mode, and the geometric partitioning mode with triangular partition; and the acquiring module is specifically configured to: determine that none of the to-be-traversed prediction modes is allowed in response to determining that the area of the current block is smaller than an area threshold, wherein the area threshold is determined based on the size restriction condition of each candidate prediction mode in the to-be-traversed prediction modes.

In a possible implementation, the current candidate prediction mode is the sub-block merge mode, and the to-be-traversed prediction modes include the combined inter-picture merge and intra-picture prediction mode and the geometric partitioning mode with triangular partition; and the acquiring module is specifically configured to: determine that none of the to-be-traversed prediction modes is allowed in response to determining that the current block does not meet a mode restriction condition of the geometric partitioning mode with triangular partition and meets a specified condition, wherein the specified condition includes one or more of the following conditions: a sequence level enabled flag for the combined inter-picture merge and intra-picture prediction mode in the current block is in a disabled state; the prediction mode of the current block belongs to the skip mode; and the area of the current block is smaller than the area threshold set for the combined inter-picture merge and intra-picture prediction mode, and/or, the height and/or width of the current block is larger than the size threshold set for the combined inter-picture merge and intra-picture prediction mode.

In a possible implementation, the current candidate prediction mode is the combined inter-picture merge and intra-picture prediction mode, and the to-be-traversed prediction modes include the geometric partitioning mode with triangular partition; and the acquiring module is specifically configured to: determine that none of the to-be-traversed prediction modes is allowed in response to determining that the current block does not meet a mode restriction condition of the geometric partitioning mode with triangular partition.

In a possible implementation, determining that the current block does not meet the mode restriction condition of the geometric partitioning mode with triangular partition includes: determining that a sequence level enabled flag for the geometric partitioning mode with triangular partition in the current block is in a disabled state, and/or, an image frame where the current block is located is a P frame.

In a possible implementation, the acquiring module is further configured to perform the step of acquiring the enablement states of the to-be-traversed prediction modes in response to determining the current candidate prediction mode is allowed for the current block.

In a possible implementation, the determining module is further configured to determine that the current candidate prediction mode is not used for the current block in response to determining the current candidate prediction mode is not allowed for the current block. Here, the current candidate prediction mode being not allowed for the current block refers to that the current block does not meet a mode restriction condition of the current candidate prediction mode, and as such, it is determined that none of the to-be-traversed prediction modes is allowed, wherein the mode restriction condition includes the size restriction condition, the restriction condition of other modes, the frame type restriction condition, and the sequence level enabled flag restriction condition.

In a possible implementation, the determining module is specifically configured to:

determine that the current candidate prediction mode is enabled for the current block in response to determining that the number of prediction modes that are allowed in the to-be-traversed prediction modes is 0.

In the process of coding the current block, if which prediction mode is enabled for the current block needs to be determined, the enablement states of the to-be-traversed prediction modes are acquired for the current candidate prediction mode. The to-be-traversed prediction modes includes at least one candidate prediction mode used for predicting the current block other than the current candidate prediction mode. Then, based on the enablement states of the to-be-traversed prediction modes, it can be determined whether to code the indication information of the current candidate prediction mode. If none of the to-be-traversed prediction modes is allowed, the step of coding the indication information can be skipped, and it can be directly determined that the current candidate prediction modem is used for the current block. Unlike the related art where the indication information of the current candidate prediction mode must be coded, the process of coding the prediction mode is simplified, the efficiency in coding the prediction mode is improved, and the code rate overhead is saved.

It should be noted that the coding apparatuses according to the above embodiments, when used for coding the prediction mode, are only exemplified by dividing the apparatuses into the above respective functional modules. In practice, the above functions may be performed by the different functional modules according to requirements. That is, the internal structure of the apparatuses may be divided into different functional modules to perform all or parts of the functions described above. In addition, the coding apparatuses according to the above embodiments have the same concept as the embodiments of the methods for coding the prediction mode. References can be made to the method embodiments for the specific implementation process, which is not repeated here.

Figure 5:
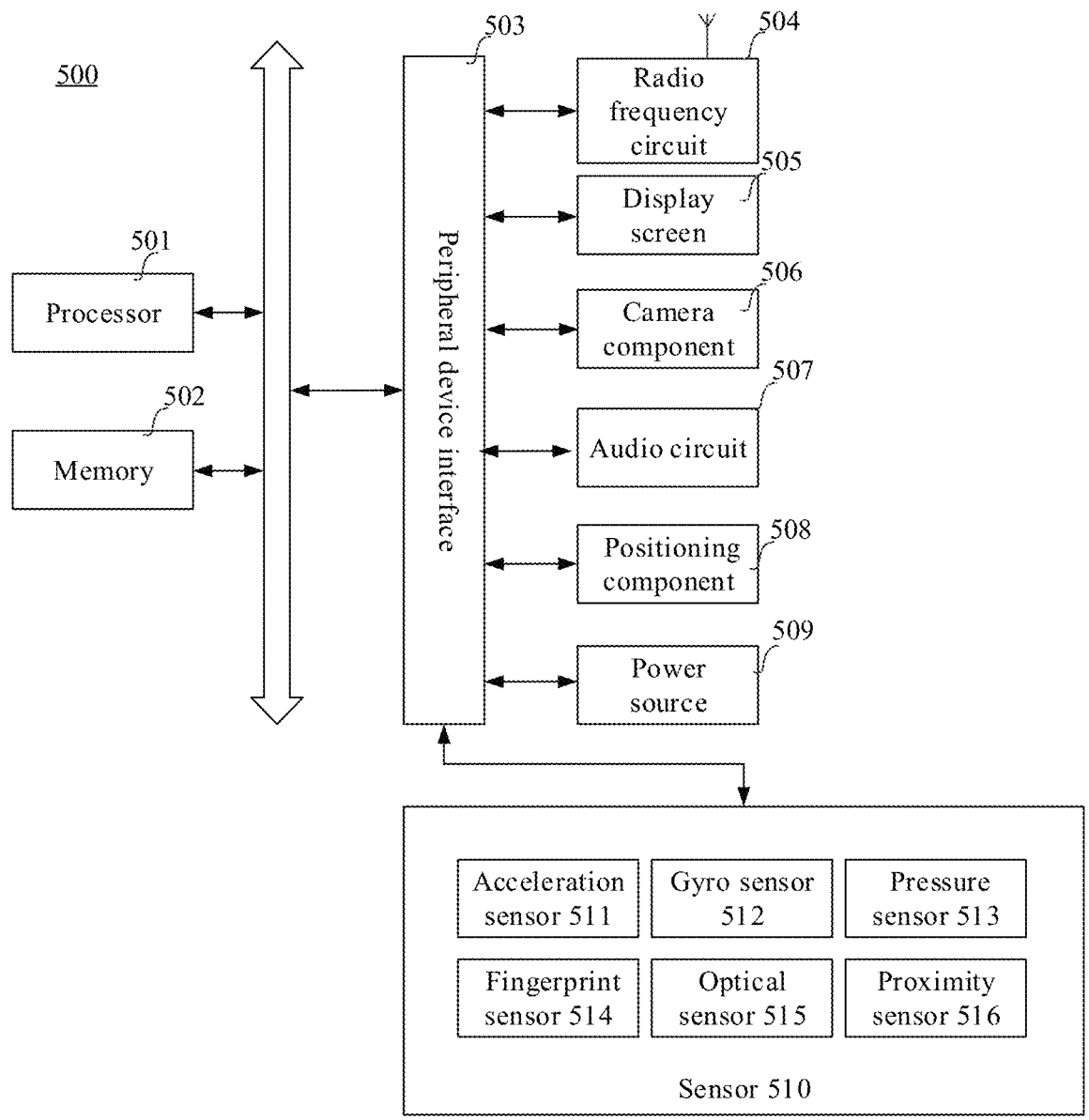
FIG. 5 is a structural diagram of a coding and decoding apparatus according to an embodiment of the present disclosure.

FIG. 5 is a structural diagram of an electronic device 500 according to an embodiment of the present disclosure. The electronic device 500 may be a smartphone, a tablet computer, a moving picture experts group audio layer III (MP3) player, a moving picture experts group audio layer IV (MP4) player, a laptop computer, or a desktop computer. The electronic device 500 may also be called user equipment (UE), a portable electronic device, a laptop electronic device, a desktop electronic device, and the like. The decoding apparatus or the coding apparatus involved in the embodiments of the present disclosure can all be implemented by the electronic device shown in FIG. 5.

Generally, the electronic device 500 includes a processor 501 and a memory 502.

The processor 501 may include one or more processing cores, such as a 4-core processor, an 8-core processor, or the like. The processor 501 may be implemented by at least one hardware selected from a digital signal processing (DSP), a field-programmable gate array (FPGA), and a programmable logic array (PLA). The processor 501 may also include a host processor and a coprocessor. The host processor is a processor for processing data in an awake state and is also called a central processing unit (CPU). The coprocessor is a low-power-consumption processor for processing data in a standby state. In some embodiments, the processor 501 may be integrated with a graphics processing unit (GPU), which is configured to render and draw the content that needs to be displayed by a display screen. In some embodiments, the processor 501 may also include an artificial intelligence (AI) processor configured to process computational operations related to machine learning.

The memory 502 may include one or more computer-readable storage mediums, which may be non-transitory. The memory 502 may also include a high-speed random access memory, as well as a non-volatile memory, such as one or more disk storage devices and flash storage devices. In some embodiments, the non-transitory computer-readable storage medium in the memory 502 is configured to store at least one instruction. The at least one instruction is configured to be executed by the processor 501 to perform the method for decoding the prediction mode or the method for coding the prediction mode according to the method embodiments of the present disclosure.

In some embodiments, the electronic device 500 may optionally include a peripheral device interface 503 and at least one peripheral device. The processor 501, the memory 502, and the peripheral device interface 503 may be connected by a bus or a signal line. Each peripheral device may be connected to the peripheral device interface 503 by a bus, a signal line, or a circuit board. For example, the peripheral device includes at least one radio frequency circuit 504, a display screen 505, a camera component 506, an audio circuit 507, a positioning component 508, and a power source 509.

The peripheral device interface 503 may be configured to connect at least one peripheral device associated with an input/output (I/O) to the processor 501 and the memory 502. In some embodiments, the processor 501, the memory 502, and the peripheral device interface 503 are integrated on the same chip or circuit board. In some other embodiments, any one or two of the processor 501, the memory 502, and the peripheral device interface 503 may be implemented on a separate chip or circuit board, which is not limited in the present embodiment.

The radio frequency circuit 504 is configured to receive and transmit a radio frequency (RF) signal, which is also referred to as an electromagnetic signal. The radio frequency circuit 504 communicates with a communication network and other communication devices via the electromagnetic signal. The radio frequency circuit 504 converts the electrical signal into the electromagnetic signal for transmission, or converts the received electromagnetic signal into the electrical signal. Optionally, the radio frequency circuit 504 includes an antenna system, an RF transceiver, one or more amplifiers, a tuner, an oscillator, a digital signal processor, a codec chipset, a subscriber identity module card, and the like. The radio frequency circuit 504 may communicate with other electronic devices via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the RF circuit 504 may also include near field communication (NFC) related circuits, which is not limited in the present disclosure.

The display screen 505 is configured to display a user interface (UI). The UI may include graphics, text, icons, videos, and any combination thereof. When the display screen 505 is a touch display screen, the display screen 505 also can acquire touch signals on or over the surface of the display screen 505. The touch signal may be input into the processor 501 as a control signal for processing. In this case, the display screen 505 may also be configured to provide virtual buttons and/or virtual keyboards, which are also referred to as soft buttons and/or soft keyboards. In some embodiments, one display screen 505 may be disposed on the front panel of the electronic device 500. In some other embodiments, at least two display screens 505 may be respectively disposed on different surfaces of the electronic device 500 or in a folded design. In further embodiments, the display screen 505 may be a flexible display screen disposed on the curved or folded surface of the electronic device 500. In some cases, the display screen 505 may even have an irregular shape, rather than a rectangle shape; that is, the display screen 505 may be irregular-shaped. The display screen 505 may be prepared with a liquid crystal display (LCD), an organic light-emitting diode (OLED), or other materials.

The camera component 506 is configured to capture images or videos. Optionally, the camera component 506 includes a front camera and a rear camera. Usually, the front camera is arranged on the front panel of the electronic device, and the rear camera is arranged on the back surface of the electronic device. In some embodiments, at least two rear cameras are disposed, and each of the at least two rear cameras is one camera selected from a main camera, a depth-of-field camera, a wide-angle camera, and a telephoto camera, so as to realize a background blurring function achieved via fusion of the main camera and the depth-of-field camera, panoramic shooting and virtual reality (VR) shooting functions achieved via fusion of the main camera and the wide-angle camera, or other fusion shooting functions. In some embodiments, the camera component 506 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 507 may include a microphone and a speaker. The microphone is configured to collect sound waves of users and environments, and convert the sound waves into electrical signals which are input into the processor 501 for processing, or input into the radio frequency circuit 504 for voice communication. For stereo acquisition or noise reduction, there may be a plurality of microphones respectively disposed at different locations of the electronic device 500. The microphone may also be an array microphone or an omnidirectional acquisition microphone. The speaker is configured to convert the electrical signals from the processor 501 or the radio frequency circuit 504 into the sound waves. The speaker may be a conventional film speaker or a piezoelectric ceramic speaker. When the speaker is the piezoelectric ceramic speaker, it can not only convert the electrical signal into human-audible sound waves but also convert the signal into the sound waves which are inaudible to humans for the purpose of ranging and the like. In some embodiments, the audio circuit 507 may also include a headphone jack.

The positioning component 508 is configured to locate the current geographic location of the electronic device 500 to implement navigation or location-based service (LBS). The positioning component 508 may be a positioning component based on the Global Positioning System (GPS) of the United States, the Beidou system of China, the Grenas system of Russia, or the Galileo system of the European Union.

The power source 509 is configured to power the various components in the electronic device 500. The power source 509 may be alternating current, direct current, a disposable battery, or a rechargeable battery. When the power source 509 includes the rechargeable battery, the rechargeable battery may support wired charging or wireless charging. The rechargeable battery may also support the fast charging technology.

In some embodiments, the electronic device 500 also includes one or more sensors 510. The one or more sensors 510 include, but are not limited to, an acceleration sensor 511, a gyro sensor 512, a pressure sensor 513, a fingerprint sensor 514, an optical sensor 515, and a proximity sensor 516.

The acceleration sensor 511 may detect magnitudes of accelerations on three coordinate axes of a coordinate system established by the electronic device 500. For example, the acceleration sensor 511 may be configured to detect components of gravitational acceleration on the three coordinate axes. The processor 501 may control the display screen 505 to display a user interface in a landscape view or a portrait view according to a gravity acceleration signal collected by the acceleration sensor 511. The acceleration sensor 511 may also be configured to collect motion data of a game or a user.

The gyro sensor 512 can detect an orientation and a rotation angle of the electronic device 500, and may cooperate with the acceleration sensor 511 to collect a 3D motion of the user on the electronic device 500. Based on the data collected by the gyro sensor 512, the processor 501 can serve the following functions: motion sensing (such as changing the UI according to a user's tilt operation), image stabilization during shooting, game control, and inertial navigation.

The pressure sensor 513 may be disposed on a side frame of the electronic device 500 and/or a lower layer of the display screen 505. When the pressure sensor 513 is disposed on the side frame of the electronic device 500, a holding signal caused by a user's holding the electronic device 500 can be detected. The processor 501 can perform left-right hand recognition or quick operation according to the holding signal collected by the pressure sensor 513. When the pressure sensor 513 is disposed on the lower layer of the display screen 505, the processor 501 controls an operable control on the UI according to a user's pressure operation on the display screen 505. The operable control includes at least one of a button control, a scroll bar control, an icon control, and a menu control.

The fingerprint sensor 514 is configured to collect a user's fingerprint. The processor 501 identifies the user's identity based on the fingerprint collected by the fingerprint sensor 514, or the fingerprint sensor 514 identifies the user's identity based on the collected fingerprint. When the user's identity is authenticated, the processor 501 authorizes the user to perform related sensitive operations, such as unlocking the screen, viewing encrypted information, downloading software, paying, and changing settings. The fingerprint sensor 514 may be provided at the front, back, or side face of the electronic device 500. When the electronic device 500 is provided with a physical button or a manufacturer's Logo, the fingerprint sensor 514 may be integrated with the physical button or the manufacturer's Logo.

The optical sensor 515 is configured to collect ambient light intensity. In one embodiment, the processor 501 may control the display brightness of the display screen 505 according to the ambient light intensity collected by the optical sensor 515. Specifically, when the ambient light intensity is relatively high, the display brightness of the display screen 505 is increased; and when the ambient light intensity is relatively low, the display brightness of the display screen 505 is decreased. In another embodiment, the processor 501 may also dynamically adjust shooting parameters of the camera component 506 according to the ambient light intensity collected by the optical sensor 515.

The proximity sensor 516, also referred to as a distance sensor, is usually disposed on the front panel of the electronic device 500. The proximity sensor 516 is configured to capture a distance between the user and a front surface of the electronic device 500. In one embodiment, when the proximity sensor 516 detects that the distance between the user and the front surface of the electronic device 500 gradually decreases, the processor 501 controls the display screen 505 to switch from a screen-on state to a screen-off state. When it is detected that the distance between the user and the front surface of the electronic device 500 gradually increases, the processor 501 controls the display screen 505 to switch from the screen-off state to the screen-on state.

It can be understood by those skilled in the art that the structure shown in FIG. 5 does not constitute a limitation on the electronic device 500, and may include more or fewer components than the structure as illustrated, or some components may be combined or different components arrangements may be adopted.

The embodiments of the present disclosure also provide a non-transitory computer-readable storage medium. The instructions in the storage medium, when executed by a processor of an electronic device, cause the electronic device to be capable of performing the method for decoding the prediction mode or the method for coding the prediction mode according to the above embodiments.

The embodiments of the present disclosure also provide a computer program product containing instructions. The computer program product, when running on an electronic device, causes the electronic device to perform the method for decoding the prediction mode or the method for coding the prediction mode according to the above embodiments.

Persons of ordinary skill in the art can understand that all or parts of the steps described in the above embodiments can be completed by hardware, or by relevant hardware instructed by applications stored in a computer-readable storage medium, such as a read-only memory, a disk, a CD, or the like.

The foregoing descriptions are merely exemplary embodiments of the present disclosure, and are not intended to limit the present disclosure. Within the spirit and principles of the disclosure, any modifications, equivalent substitutions, improvements, and the like, are within the protection scope of the present disclosure.

What is claimed is:

1. A method for decoding a prediction mode comprising:
in response to determining that a merge mode is enabled for a current block and a current candidate prediction mode is allowed for the current block:
acquiring enablement states of one or more to-be-traversed prediction modes, wherein the one or more to-be-traversed prediction modes comprise at least one candidate prediction mode used for predicting the current block, the at least one candidate prediction mode being different than the current candidate prediction mode;
at a first time in response to determining that a candidate prediction mode being allowed is present in the one or more to-be-traversed prediction modes, decoding indication information of the current candidate prediction mode from a code stream, wherein the indication information is configured to indicate whether to enable the current candidate prediction mode for the current block; and
at a second time, in response to determining that none of the one or more to-be-traversed prediction modes is allowed, determining that the current candidate prediction mode is used for the current block without decoding the indication information of the current candidate prediction mode from the code stream,
wherein the method is executed by a processor.

2. The method according to claim 1, wherein both the current candidate prediction mode and the candidate prediction mode in the to-be-traversed prediction modes are prediction modes based on the merge mode, and the prediction modes based on the merge mode at least comprise a regular merge mode, a merge mode with motion vector difference, a sub-block motion information based merge mode, or a combined inter-picture merge and intra-picture prediction mode.

3. The method according to claim 1, wherein:
acquiring the enablement states of the to-be-traversed prediction modes comprises:
determining that none of the to-be-traversed prediction modes is allowed in response to determining that the current block does not meet a mode restriction condition of each candidate prediction mode in the to-be-traversed prediction modes, wherein the mode restriction condition comprises a size restriction condition, a restriction condition of other modes, a frame type restriction condition, and an enabled flag restriction condition; or
determining that the current candidate prediction mode is not used for the current block in response to determining that the current candidate prediction mode is not allowed for the current block, wherein it is determined that the current candidate prediction mode is not allowed for the current block in response to determining that the current block does not meet a mode restriction condition of the current candidate prediction mode, wherein the mode restriction condition comprises a size restriction condition, a restriction condition of other modes, a frame type restriction condition, and an enabled flag restriction condition; or
determining that the current candidate prediction mode is allowed for the current block by:
determining that the current candidate prediction mode is allowed for the current block in response to the current block meeting all mode restriction conditions for enabling the current candidate prediction mode; or
determining that any candidate prediction mode in the to-be-traversed prediction modes is allowed for the current block in response to the current block meeting all mode restriction conditions of the candidate prediction mode.

4. The method according to claim 1, wherein:
in the case that the current candidate prediction mode is a combined inter-picture merge and intra-picture prediction mode, the method further comprises: determining that the combined inter-picture merge and intra-picture prediction mode is allowed for the current block, in response to an enabled flag for the combined inter-picture merge and intra-picture prediction mode being in an enabled state, an area of the current block being greater than or equal to 64, and both a height and a width of the current block being less than respective thresholds; and otherwise, determining that the combined inter-picture merge and intra-picture prediction mode is not allowed for the current block; or in the case that the current candidate prediction mode is a combined inter-picture merge and intra-picture prediction mode, the method further comprises: determining that the combined inter-picture merge and intra-picture prediction mode is not used for the current block and setting a value of a mode flag bit of the combined inter-picture merge and intra-picture prediction mode to 0 in response to determining that the combined inter-picture merge and intra-picture prediction mode is not allowed for the current block; or the method further comprises:

determining that the combined inter-picture merge and intra-picture prediction mode is not allowed for the current block, in response to a value of a sequence level enabled flag for the combined inter-picture merge and intra-picture prediction mode being 0, wherein the value of the sequence level enabled flag is present in a sequence parameter set; or determining that the combined inter-picture merge and intra-picture prediction mode is not allowed for the current block, in response to a height or a width of the current block being equal to or greater than 128.

5. The method according to claim 1, further comprising: directly setting a value of a mode flag bit of the current candidate prediction mode to 0 without decoding the mode flag bit of the current candidate prediction mode, in response to determining that the current candidate prediction mode is not allowed for the current block.

6. The method according to claim 1, further comprising: determining that a combined inter-picture merge and intra-picture prediction mode is not allowed for the current block in response to the merge mode enabled for the current block belonging to a skip mode.

7. The method according to claim 1, further comprising: determining that a merge mode with motion vector difference is not allowed for the current block, in response to a value of a sequence level enabled flag for the merge mode with motion vector difference being 0, wherein the value of the sequence level enabled flag is present in a sequence parameter set.

8. The method according to claim 1, further comprising: determining that a sub-block motion information based merge mode is not allowed for the current block in response to a size of the current block being 4×8 or 8×4.

9. The method according to claim 1, wherein in the case that the current candidate prediction mode is a combined inter-picture merge and intra-picture prediction mode and the to-be-traversed prediction modes comprise a first candidate prediction mode, the method further comprises:

determining whether the combined inter-picture merge and intra-picture prediction mode is allowed for the current block;

acquiring an enablement state of the current block for the first candidate prediction mode, in response to determining that the combined inter-picture merge and intra-picture prediction mode is allowed for the current block;

acquiring and decoding, in response to determining that the first candidate prediction mode is allowed for the current block, a flag bit of the combined inter-picture merge and intra-picture prediction mode;

determining whether to enable the combined inter-picture merge and intra-picture prediction mode for the current block based on decoded information of the flat bit, wherein the first candidate prediction mode is configured to predict, based on motion information of the current block, two triangular sub-blocks acquired by dividing the current block according to a preset angle, the preset angle comprising 45° or 135°; and determining that the first candidate prediction mode is allowed for the current block by:

determining that the first candidate prediction mode is allowed for the current block, in response to determining that a regular merge mode, a merge mode with motion vector difference, a sub-block motion information based merge mode, and a combined inter-picture merge and intra-picture prediction mode are all disabled; or in the case that the current candidate prediction mode is a combined inter-picture merge and intra-picture prediction mode and the to-be-traversed prediction modes comprise a first candidate prediction mode, the method further comprises:

determining whether the combined inter-picture merge and intra-picture prediction mode is allowed for the current block;

acquiring an enablement state of the current block for the first candidate prediction mode, in response to determining that the combined inter-picture merge and intra-picture prediction mode is allowed for the current block; and directly determining that the combined inter-picture merge and intra-picture prediction mode is used for the current block without decoding flag bit, in response to determining that the first candidate prediction mode is not allowed for the current block, wherein the first candidate prediction mode is configured to predict, based on motion information of the current block, two triangular sub-blocks acquired by dividing the current block according to a preset angle, the preset angle comprising 45° or 135°; and determining that the first candidate prediction mode is not allowed for the current block by:

determining that the first candidate prediction mode is not allowed for the current block in response to a value of a sequence level enabled flag for the first candidate prediction mode being 0, wherein the value of the sequence level enabled flag is present in a sequence parameter set; or determining that the first candidate prediction mode is not allowed for the current block in response to a current frame where the current block is located is a P frame.

10. A method for coding a prediction mode comprising:

in response to determining that a merge mode is enabled for a current block and a current candidate prediction mode is allowed for the current block:

acquiring enablement states of one or more to-be-traversed prediction modes, wherein the one or more to-be-traversed prediction modes comprise at least one candidate prediction mode used for predicting the current block, the at least one candidate prediction mode being different than the current candidate prediction mode;

at a first time, in response to determining that a candidate prediction mode being allowed is present in the one or more to-be-traversed prediction modes, coding indication information of the current candidate prediction mode into a code stream, wherein the indication information is configured to indicate whether to enable the current candidate prediction mode for the current block; and at a second time, in response to determining that none of the one or more to-be-traversed prediction modes is allowed, not coding the indication information of the current candidate prediction mode into the code stream, wherein the method is executed by a processor.

11. The method according to claim 10, wherein both the current candidate prediction mode and the candidate prediction mode in the to-be-traversed prediction modes are prediction modes based on the merge mode, and the prediction modes based on the merge mode at least comprise a regular merge mode, a merge mode with motion vector difference, a sub-block motion information based merge mode, or a combined inter-picture merge and intra-picture prediction mode; or acquiring the enablement states of the to-be-traversed prediction modes comprises:
determining that none of the to-be-traversed prediction modes is allowed in response to determining that the current block does not meet a mode restriction condition of each candidate prediction mode in the to-be-traversed prediction modes, wherein the mode restriction condition comprises a size restriction condition, a restriction condition of other modes, a frame type restriction condition, and an enabled flag restriction condition.

12. The method according to claim 10, further comprising:
determining that the current candidate prediction mode is not used for the current block in response to determining that the current candidate prediction mode is not allowed for the current block, wherein the current candidate prediction mode is not allowed for the current block in response determining that the current block does not meet a mode restriction condition of the current candidate prediction mode, wherein the mode restriction condition comprises a size restriction condition, a restriction condition of other modes, a frame type restriction condition, and an enabled flag restriction condition; or
in the case that the current candidate prediction mode is a combined inter-picture merge and intra-picture prediction mode, the method further comprises:
determining that the combined inter-picture merge and intra-picture prediction mode is allowed for the current block in response to an enabled flag for the combined inter-picture merge and intra-picture prediction mode being in an enabled state, an area of the current block being greater than or equal to 64, and both a height and a width of the current block being less than respective thresholds; and otherwise, determining that the combined inter-picture merge and intra-picture prediction mode is not allowed for the current block.

13. A decoding apparatus comprising a processor configured to:
in response to determining that a merge mode is enabled for a current block and a current candidate prediction mode is allowed for the current block:
acquire enablement states of one or more to-be-traversed prediction modes, wherein the one or more to-be-traversed prediction modes comprise at least one candidate prediction mode used for predicting the current block, the at least one candidate prediction mode being different than the current candidate prediction mode;
in response to determining that a candidate prediction mode being allowed is present in the one or more to-be-traversed prediction modes, decode indication information of the current candidate prediction mode from a code stream, wherein the indication information is configured to indicate whether to enable the current candidate prediction mode for the current block; and
in response to determining that none of the one or more to-be-traversed prediction modes is allowed, determine that the current candidate prediction mode is used for the current block without decoding the indication information of the current candidate prediction mode from the code stream.

14. A coding apparatus comprising a processor configured to:
in response to determining that a merge mode is enabled for a current block and a current candidate prediction mode is allowed for the current block:
acquire enablement states of one or more to-be-traversed prediction modes, wherein the one or more to-be-traversed prediction modes comprise at least one candidate prediction mode used for predicting the current block the at least one candidate prediction mode being different than the current candidate prediction mode;
in response to determining that a candidate prediction mode being allowed is present in the one or more to-be-traversed prediction modes, code indication information of the current candidate prediction mode into a code stream, wherein the indication information is configured to indicate whether to enable the current candidate prediction mode for the current block; and
in response to determining that none of the one or more to-be-traversed prediction modes is allowed, not code the indication information of the current candidate prediction mode into the code stream.

15. A decoding device, comprising:
a processor; and
a memory configured to store one or more instructions executable by the processor;
wherein the instructions, when executed by the processor, cause the processor to perform the method of claim 1.

16. A coding device, comprising:
a processor; and
a memory configured to store one or more instructions executable by the processor;
wherein the instructions, when executed by the processor, cause the processor to perform the method of claim 10.

17. An electronic device, comprising:
a processor; and
a memory configured to store one or more instructions executable by the processor;
wherein the instructions, when executed by the processor, cause the processor to perform the method of claim 1.

18. An electronic device, comprising:
a processor; and
a memory configured to store one or more instructions executable by the processor;
wherein the instructions, when executed by the processor, cause the processor to perform the of claim 10.

19. A non-transitory computer-readable storage medium storing one or more instructions, wherein the one or more instructions, when executed by a processor of an electronic device, cause the processor to perform the method of claim 1.

20. A non-transitory computer-readable storage medium storing one or more instructions, wherein the one or more instructions, when executed by a processor of an electronic device, cause the processor to perform the method of claim 10.

* * * * *